United States Patent [19]
Nakada et al.

[11] Patent Number: 5,389,949
[45] Date of Patent: Feb. 14, 1995

[54] VIDEO SIGNAL PROCESSOR

[75] Inventors: Akira Nakada; Toshio Orii; Shigeo Tsuruoka; Jun Nakamura, all of Nagano; Kimio Yamamura, Tokyo, all of Japan

[73] Assignee: Seiko Epson Corporation, Tokyo, Japan

[21] Appl. No.: 197,458

[22] Filed: Feb. 16, 1994

Related U.S. Application Data

[63] Continuation of Ser. No. 990,003, Dec. 14, 1992, abandoned, which is a continuation of Ser. No. 746,152, Aug. 14, 1991, abandoned, which is a continuation of Ser. No. 238,206, Aug. 30, 1988, abandoned.

[30] Foreign Application Priority Data

| Aug. 31, 1987 | [JP] | Japan | 65-217559 |
| Sep. 2, 1987 | [JP] | Japan | 62-219992 |
| Sep. 14, 1987 | [JP] | Japan | 62-230202 |
| Sep. 14, 1987 | [JP] | Japan | 62-230205 |
| Sep. 14, 1987 | [JP] | Japan | 62-230207 |
| Sep. 14, 1987 | [JP] | Japan | 62-230209 |
| Sep. 14, 1987 | [JP] | Japan | 62-280208 |
| Jul. 11, 1988 | [JP] | Japan | 63-173563 |

[51] Int. Cl.⁶ .............................. G09G 1/28
[52] U.S. Cl. ......................... 345/154; 345/213; 348/453; 348/505
[58] Field of Search ............ 345/1, 2, 3, 7, 87, 345/199, 150, 213, 153, 154; H04N 9/077, 9/45, 9/455, 9/65; 348/453, 505

[56] References Cited

U.S. PATENT DOCUMENTS

| 3,595,988 | 7/1971 | Kawamata | 358/28 |
| 4,303,912 | 12/1981 | Stafford et al. | 358/13 |
| 4,442,428 | 4/1984 | Dean et al. | 358/10 |
| 4,533,909 | 8/1985 | Sander | 345/150 |
| 4,536,856 | 8/1985 | Hiroishi | 345/87 |
| 4,686,520 | 8/1987 | Yamaoka | 358/27 |
| 4,727,362 | 2/1988 | Rackley et al. | 358/148 |
| 4,737,772 | 4/1988 | Nishi et al. | 358/11 |
| 4,739,403 | 4/1988 | Mark | 358/148 |
| 4,751,502 | 6/1988 | Ishii et al. | 345/1 |
| 4,760,387 | 7/1988 | Ishii et al. | 345/3 |
| 4,799,053 | 1/1989 | Van Aken et al. | 345/199 |
| 4,926,166 | 5/1990 | Fujisawa et al. | 345/3 |
| 4,980,678 | 12/1990 | Zenda | 345/3 |
| 4,998,100 | 3/1991 | Ishii | 345/3 |

FOREIGN PATENT DOCUMENTS

| 0112056 | 6/1984 | European Pat. Off. |
| 0112057 | 6/1984 | European Pat. Off. |
| 2140660 | 11/1984 | United Kingdom |

Primary Examiner—Richard Hjerpe
Attorney, Agent, or Firm—Spensley Horn Jubas & Lubitz

[57] ABSTRACT

A video signal processor comprising: a device defining a color pallet for converting a color code specifying the color of each pixel of a display picture into digital RGB color data; and a conversion system for converting the RGB color data into a luminance signal and two color-difference signals represented by analog values, wherein the conversion system includes: a memory storing digital values constituting a conversion system for converting the digital RGB color data into a luminance signal and two color-difference signals represented by digital values; and a digital-analog converter connected to the conversion system for converting the luminance signal and two color-difference signals represented by digital values into the luminance signal and two color-difference signals represented by analog values.

17 Claims, 20 Drawing Sheets

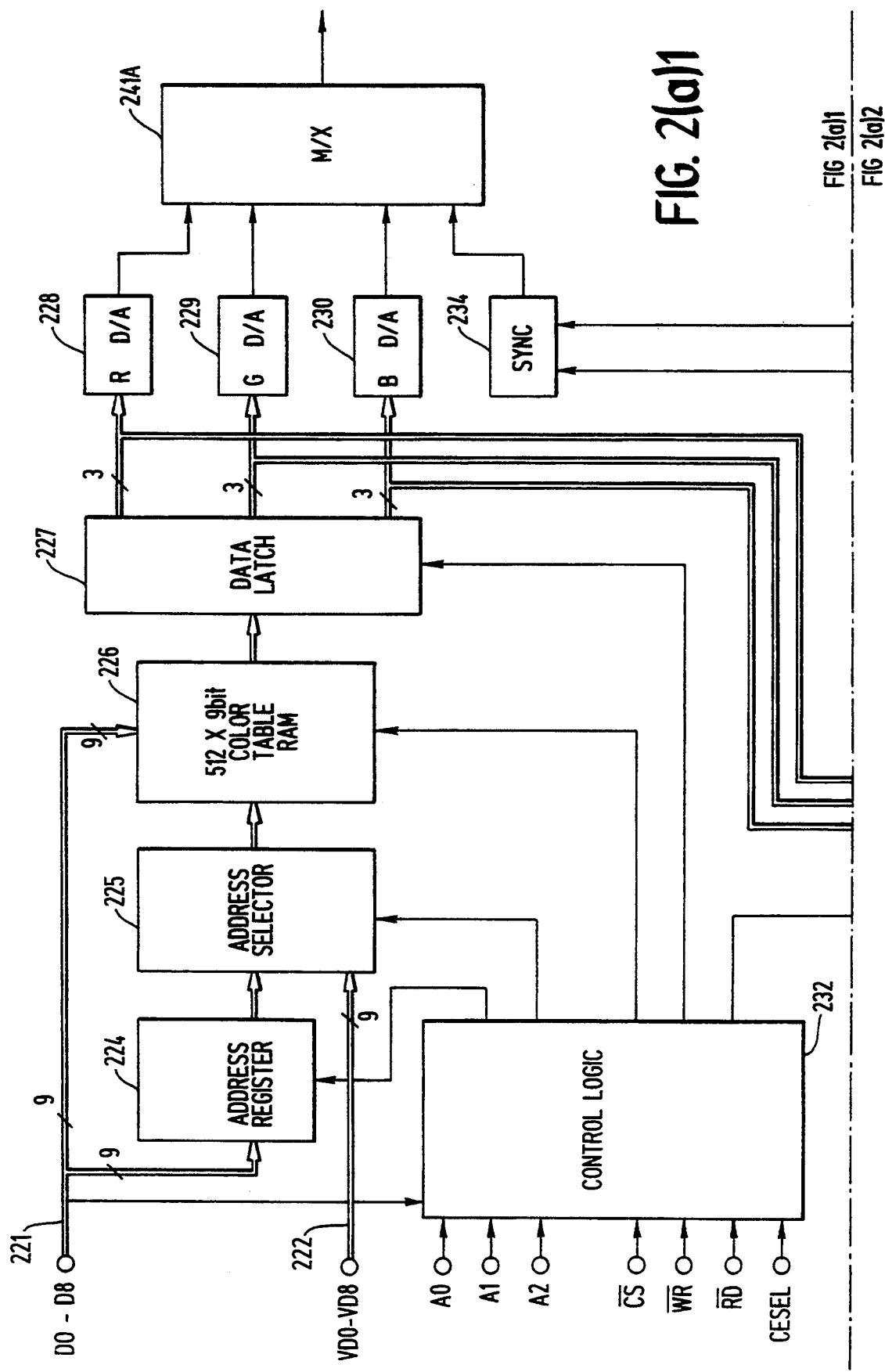

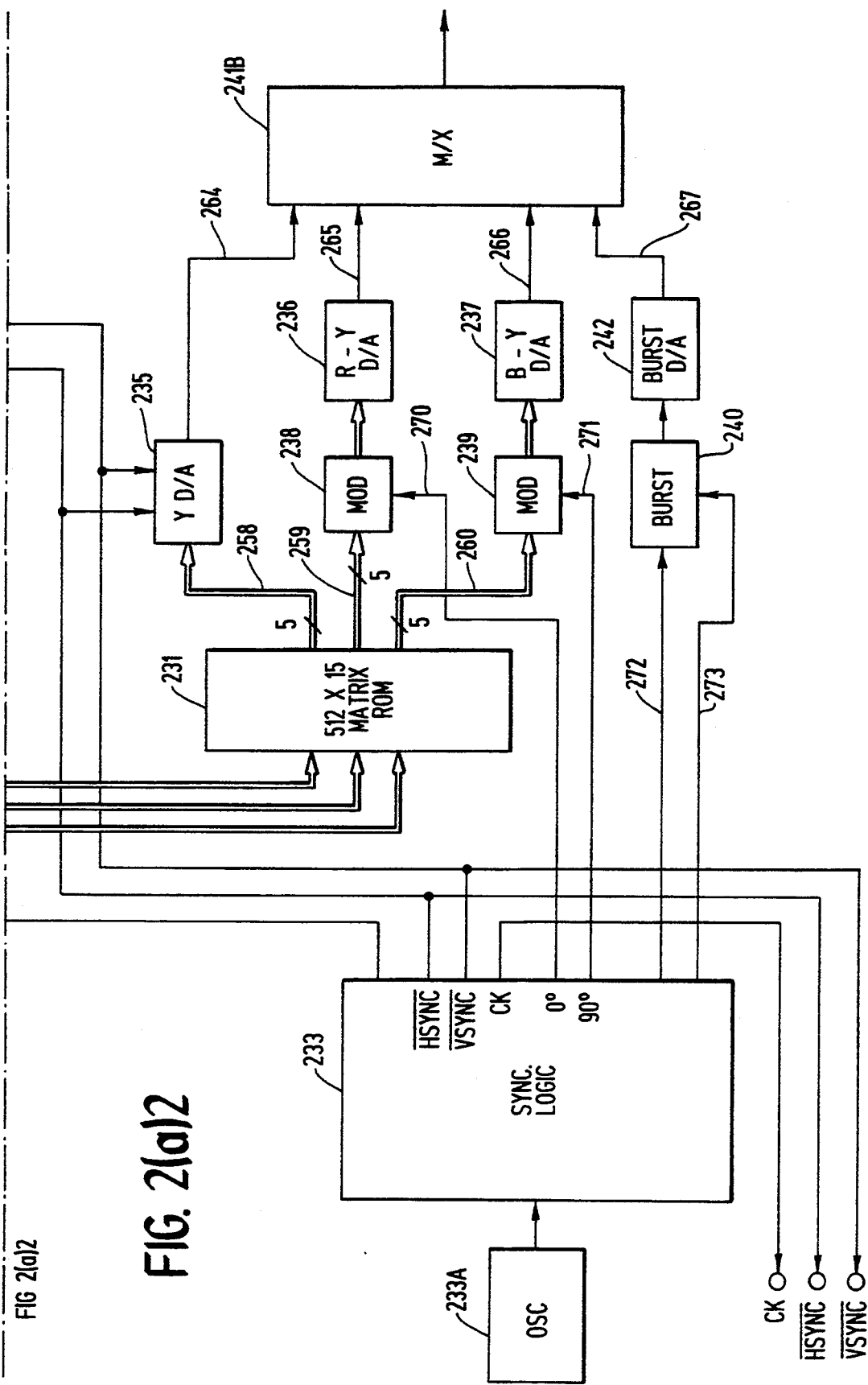

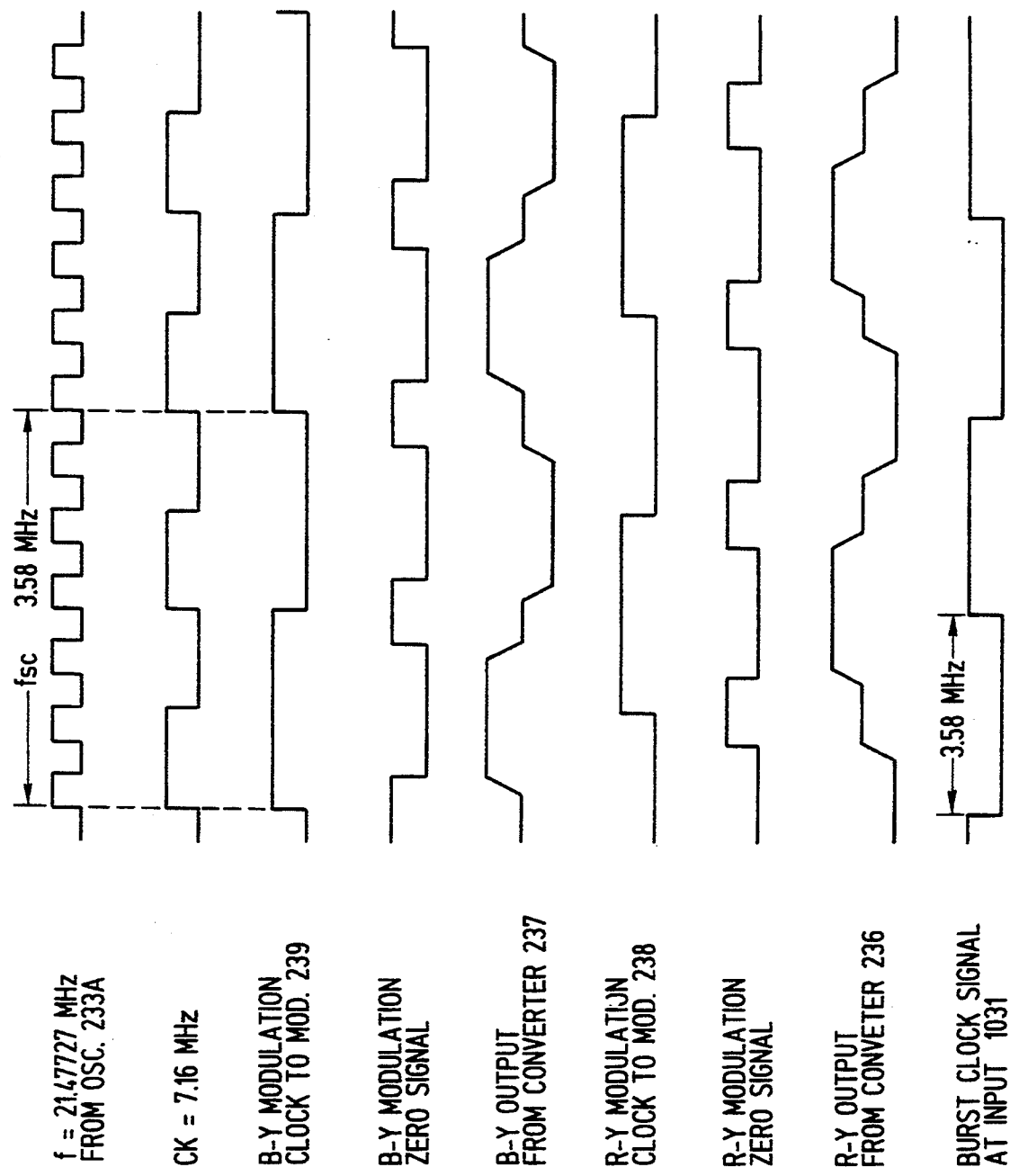

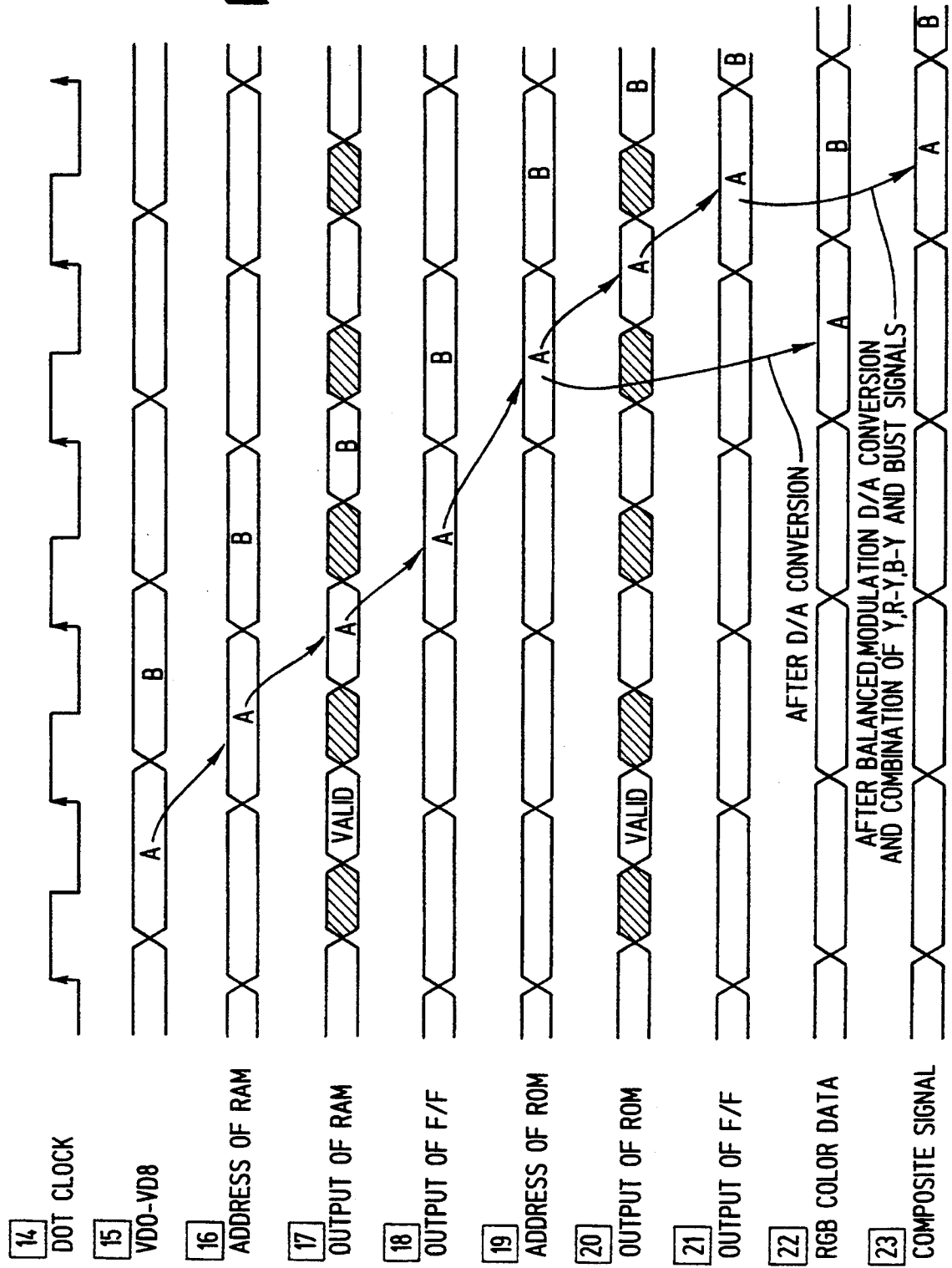

R-Y CLOCK

R-Y OUTPUT

B-Y CLOCK

B-Y OUTPUT

BLANKING SIGNAL

MODULATION ZERO SIGNAL

UNMODULATED DIGITAL DATA

AFTER MODULATION DIGITAL DATA

ANALOG SIGNAL OUTPUT

VIDEO SIGNAL PROCESSOR

This is a continuation of application Ser. No. 07/990,003, filed Dec. 14, 1992, and now abandoned, which is a continuation of application Ser. No. 07/746,152, filed on Aug. 14, 1991, also abandoned, itself a continuation of application Ser. No. 07/238,206, filed on Aug. 30, 1988, also abandoned.

BACKGROUND OF THE INVENTION

1. Field of the Invention

The present invention relates to a video signal processor for converting digital RGB data into a composite video signal (NTSC system, for example) through a digital analog converter for delivery to a CRT display unit.

2. Description of the Prior Art

A prior art picture video processor supplies signals for displaying a predetermined picture chromatically, for example, by outputting analog signals providing amplitude values for each color component R (red), G (green) and B (blue) to a special monitor set.

The picture signal processor stores picture data in a video RAM, reads the picture data out of the video RAM for each image, addresses a color data RAM having stored R, G, B color data with the picture data as address signal, and subjects the color data read out of RAM to D/A conversion, thereby generating an analog RGB signal. The analog RGB signal is then output to the monitor set to display a color picture.

When outputting a composite signal according to the NTSC system, an operation is carried out on the R, G, B color data generated from the color data RAM, and a luminance signal and two color-difference signals are derived from the operation result, thus obtaining a composite video signal.

According to another example, digital RGB color data is converted once into analog RGB signals through a D/A converter, and the three signals are subjected to analog addition and subtraction to generate a luminance signal (Y), a red color-difference signal (R−Y) and a blue color-difference signal (B−Y), thus obtaining a composite video signal.

However, since the prior art video signal processors obtain the luminance signal and the color-difference signals by operating on each picture element, or pixel, there remain problems because:

the processor must inevitably be large in size;
power consumption is high;
conversion rate is low; and so forth.

Then, in the case of analog processing, the analog signal must have a very high resolution, and in either the NTSC or PAL system it is difficult to handle a high resolution composite signal.

SUMMARY OF THE INVENTION

An object of the invention is to provide a video signal processor, for which a miniaturization in structure, a decrease in power consumption and an enhancement of conversion rate and resolution are realized.

Another object of the invention is to provide a modulator based on a novel MOS digital integrated circuit which generates a high resolution composite video signal with reduced harmonic component.

A further object of the invention is to provide a color burst generator based on a novel MOS digital integrated circuit to generate a high resolution composite video signal.

An even further object of the invention is to provide a digital-analog converter based on a novel MOS digital integrated circuit to generate a high resolution composite video signal almost free from carrier leak and phase shift.

The basic objects according to the invention are achieved by a video signal processor comprising: means defining a color pallet for converting a color code specifying the color of each pixel of a display picture into digital RGB color data; and conversion means for converting the RGB color data into a luminance signal and two color-difference signals represented by analog values, wherein the conversion means comprise: memory means storing digital values constituting a conversion system for converting the digital RGB color data into a luminance signal and two color-difference signals represented by digital values; and digital-analog converter means connected to the conversion means for converting the luminance signal and two color-difference signals represented by digital values into the luminance signal and two color-difference signals represented by analog values.

BRIEF DESCRIPTION OF THE DRAWINGS

FIGS. 2(a)1, and 2(a)2 and 2(b) are block diagrams showing a video signal generator according to the invention, FIG. 2(b) showing a detail of FIG. 2(a).

FIGS. 2(c) and 2(d) are signal diagrams illustrating the operation of the generator of FIGS. 2(a) and 2(b).

FIG. 2(f) shows the signals at various points in the circuit of FIG. 2(e).

Figure 1:
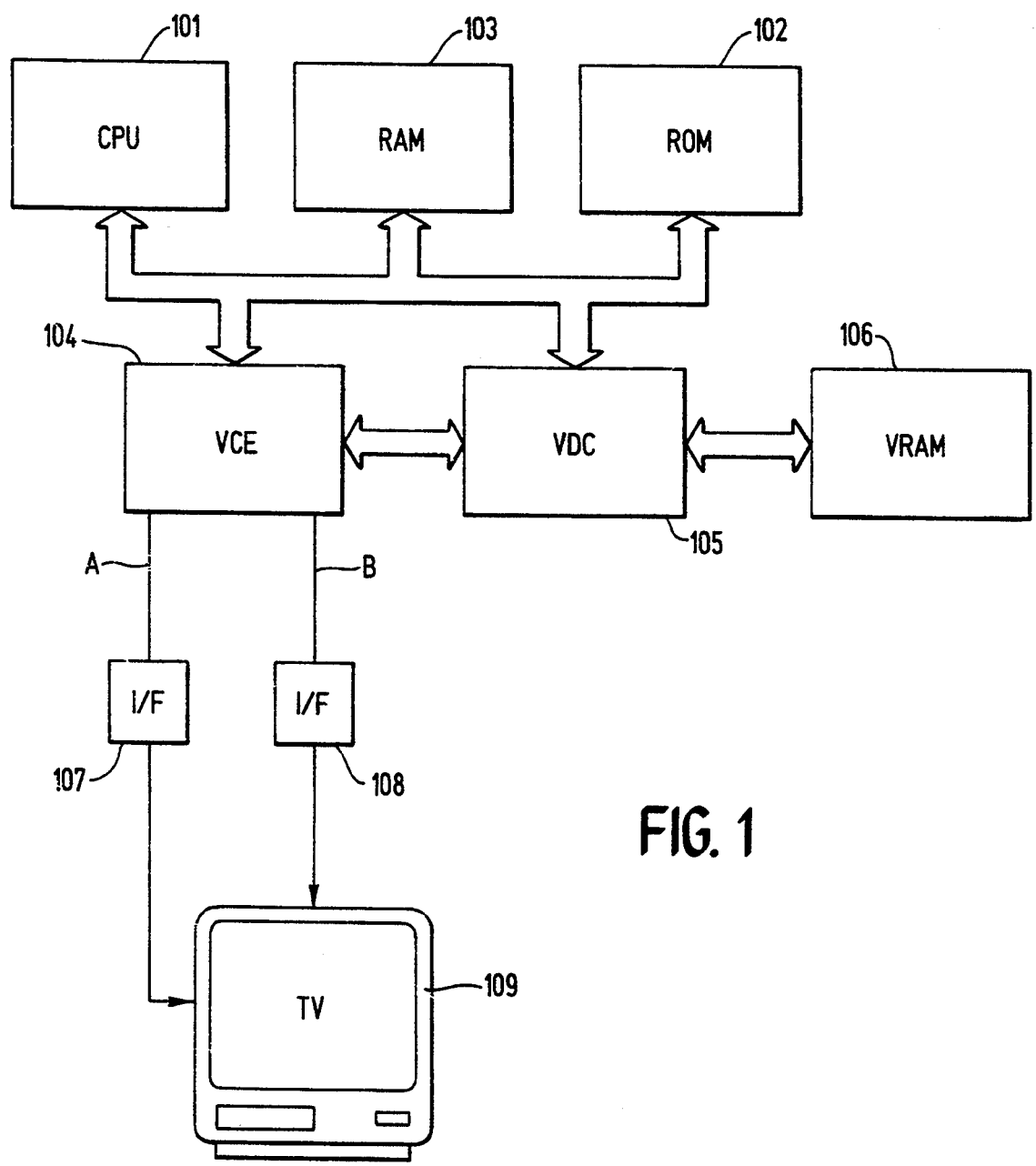
FIG. 1 is a block diagram showing a color graphics display system.

In the drawing, the reference numerals identify the following components:

FIG. 1
101 ... CPU
102 ... ROM
103 ... RAM
104 ... video color encoder
105 ... video display controller
106 ... video RAM
107, 108 ... interfaces
109 ... TV receiver
FIGS. 2(a)1 and 2(a)2
221, 222 ... data bus
224 ... address register
225 ... address selector
226 ... color table RAM
227 ... latch circuit
228, 229, 230 ... D/A converters
231 ... matrix ROM
232 ... logic controller
233 ... control signal generator
233A ... oscillator
234 ... synchronizing signal composite circuit
235, 236, 237 ... D/A converter
238, 239 ... modulator
240 ... burst signal circuit
241A ... analog RGB signal output circuit
241B ... synthesizing circuit
242 ... burst D/A converter
252 ... digital R color data input terminal
253 ... digital G color data input terminal
254 ... digital B color data input terminal
255 ... clock signal input terminal
258 ... digital Y data
259 ... digital R−Y data
260 ... digital B−Y data
264 ... analog Y data
265 ... analog R−Y data
266 ... analog B−Y data
267 ... analog burst data
269 ... composite video signal output terminal
270 ... R−Y balanced modulation carrier signal
271 ... B−Y balanced modulation carrier signal
272 ... burst signal control signal
273 ... burst generation carrier signal
FIG. 3
302 ... flip-flop
303 ... digital R color data input terminal
304 ... digital G color data input terminal
305 ... digital B color data input terminal
306 ... clock input terminal
307 ... digital Y data
308 ... digital R−Y data
309 ... digital B−Y data
310 ... address input terminal of semiconductor storage apparatus
311 ... data output terminal of semiconductor storage apparatus
FIG. 5
530 ... unmodulated data input terminal
531 ... modulation clock input terminal
532 ... modulated data output terminal
533 ... inverter
534 ... AND gate
535 ... OR gate
FIG. 8
830, 831, 832, 833, 834 ... unmodulated data input terminal
835, 836, 837, 838, 839 ... modulated data output terminal
840 ... modulation clock input terminal
841 ... modulation zero signal input terminal
FIG. 10
1030 ... burst signal control input terminal
1031 ... burst generation subcarrier signal input
1032 ... burst high level input terminal
1033 ... analog burst data output terminal
1034 ... burst low level input terminal
1035, 1036 ... resistance element
1037 ... inverter circuit
1038 ... NOR circuit
1040 ... P-channel MOSFET Q 1
1041 ... N-channel MOSFET Q 2
1042 ... P-channel MOSFET Q 3
1043 ... N-channel MOSFET Q 4
1044 ... P-channel MOSFET Q 5
1045 ... N-channel MOSFET Q 6
FIGS. 12(a) and 12(b)
1230 ... blanking signal output terminal
1231 ... modulation zero signal input terminal
1232 ... after balanced modulation digital data input terminal (uppermost bit)
1233 ... after balanced modulation digital data input terminal (next-to-highest bit)
1234 ... after balanced modulation digital data input terminal (middle bit)
1235 ... after balanced modulation digital data input terminal (next-to-lowest bit)
1236 ... after balanced modulation digital data input terminal (lowermost bit)
1237 ... analog output high level input terminal
1238 ... analog output terminal
1239 ... analog output low level input terminal
1241 ... 5 input NAND circuit
1242 ... 2 input NOR circuit
1243 ... inverter circuit
1244 ... resistor element
1245 ... P-channel MOSFET
1246 ... N-channel MOSFET
1247 ... 2 input NOR circuit
FIG. 14
1431 ... analog Y data input terminal
1432 ... analog R−Y data input terminal
1433 ... analog B−Y data input terminal
1434 ... analog burst data input terminal
1435 ... composite video signal output signal terminal
1436 ... resistance element
1437 ... capacitor element
1438 ... bipolar transistor of nPn type

DESCRIPTION OF PREFERRED EMBODIMENTS

A composite video signal generator according to the invention will now be described in detail.

FIG. 1 shows a complete system, with sound generator omitted. The system includes a CPU 101, a ROM 102 containing a control program, and a RAM 103 in which data, operation result and others are loaded temporarily. The system further includes a video signal generator, or video color encoder, 104 and a video display controller 105 for giving picture data to video signal generator 104. The picture data relates to a subject and a background and is loaded in a video RAM (VRAM) 106. The video signal generator 104 generates an analog RGB signal as output A and a composite signal as output B, which are fed to a TV receiver 109 through respective interfaces 107 and 108. The analog RGB signal is sent directly to the CRT if receiver 109 can operate as a special monitor, and the composite signal is sent to the CRT by way of a receiving circuit. Thus, a picture according to the picture data can be displayed on the CRT of TV receiver 109.

FIGS.2(a)1 and 2(a)2 illustrate one embodiment of the video signal generator 104 of FIG. 1. The generator includes a data bus 221 for receiving data D0–D8 from CPU 101 (FIG. 1) and another data bus 222 for receiving data VD0–VD8 from video display controller 105 (FIG. 1). Each bus contains 9 lines. An address register 224 is connected to data bus 221, and an address selector 225 is connected to data bus 222. Address selector 225 selects an address signal either from address register 224 or from data bus 222. A color table RAM, or color pallet, 226 having color data described below is addressed by selector 225 and the color data readout of RAM 226 is latched in a latch circuit 227 clocked by a picture element (pixel) clock signal CK.

Color data stored in latch circuit 227 is subjected to D/A conversion by D/A converters 228, 229, 230 for each primary color R, G, B, or is converted into a luminance signal Y, and color-difference signals R−Y and B−Y through a matrix ROM 231 having a signal conversion matrix.

A control unit 232 receives address signals A0 to A2, chip select signal $\overline{CS}$, write signal $\overline{WR}$, read signal $\overline{RD}$, output control signal CESEL and others from CPU 101 and controls address register 224, address selector 225 color table 226, latch circuit 227, a control signal generator 233 to be described below, and others.

Figure 2B:
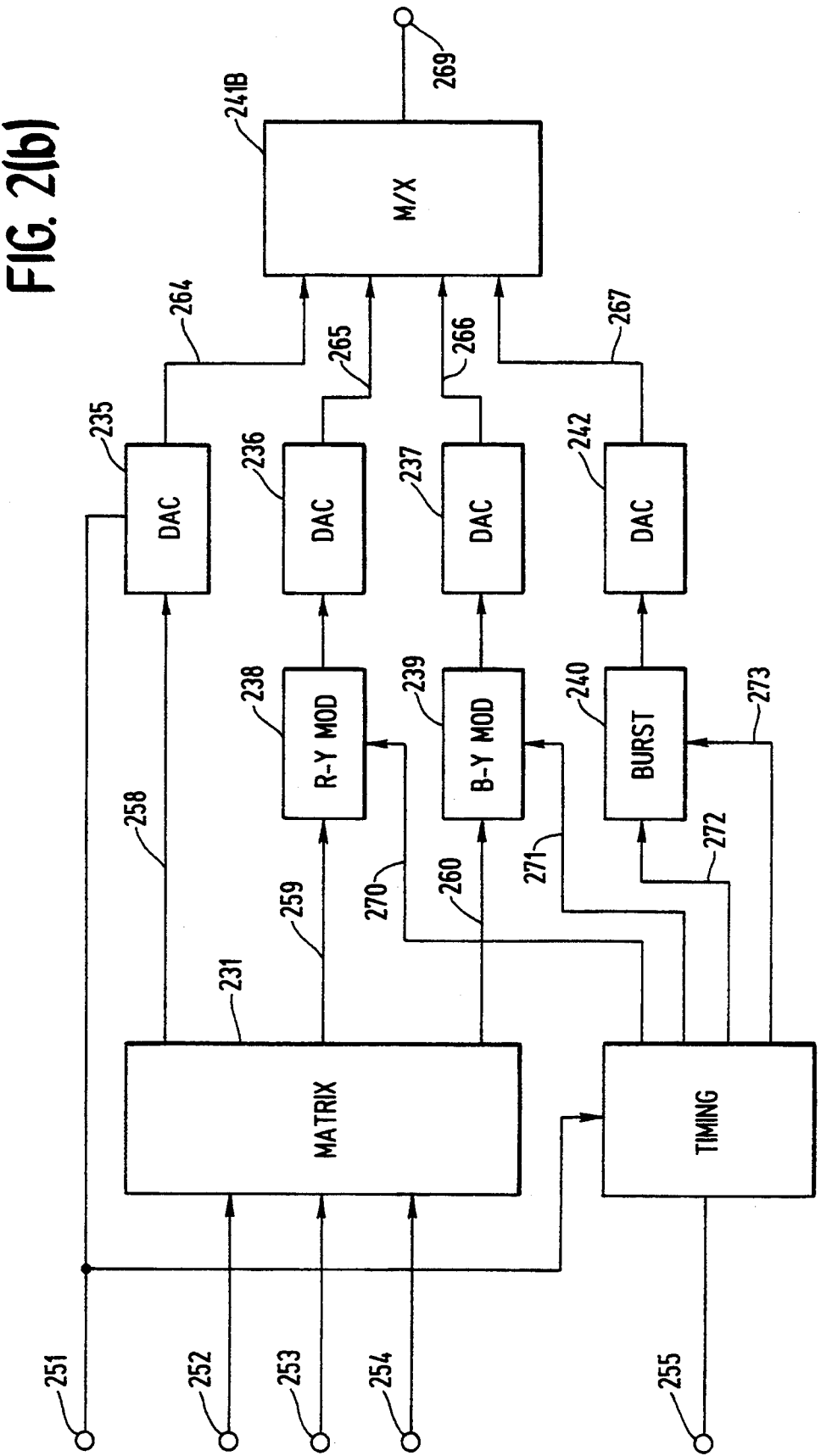
Figure 2D:
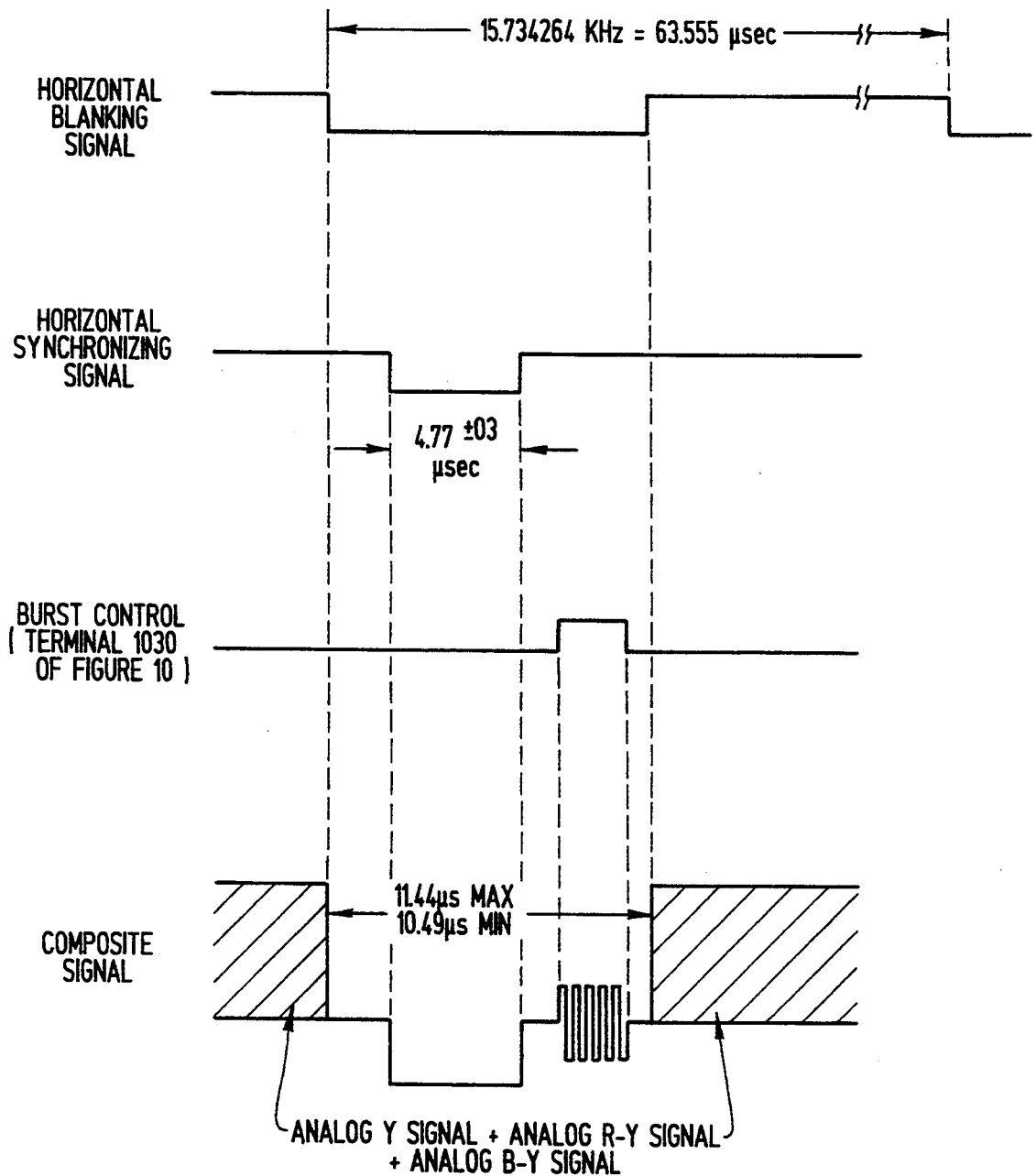

Various signals identified in the following description are shown in FIGS. 2(c) and 2(d), which depict their relative frequencies and phases and relate to the NTSC system.

The control signal generator 233 receives an oscillation signal at 21.47727 MHz, for example, from an oscillator 233A and outputs horizontal and vertical synchronizing signals $\overline{HSYNC}$, $\overline{VSYNC}$, picture element (pixel) frequency clock signal CK, R−Y balanced modulator carrier signal 270, B−Y balanced modulator carrier signal 271, shifted in phase from signal 270 by 90°, burst signal control signal 272 and burst generation carrier signal 273. Both synchronizing signals $\overline{HSYNC}$, $\overline{VSYNC}$, and clock signal CK are also fed to video display controller 105. $\overline{HSYNC}$ is shown as the second waveform of FIG. 2(d).

D/A converters 228, 229, 230 output analog RGB signals, and a synchronizing signal circuit 234 combines the horizontal and vertical synchronizing signals and then outputs them. These analog RGB signals and composite synchronizing signals are then combined in and outputted from an analog RGB signal output circuit 241A.

On the other hand, the color-difference signals R−Y, B−Y from matrix ROM 231 are subjected in modulators 238 and 239 to balanced modulation digitally by the chrominance subcarrier components 270 and 271 having a 90° phase difference. The modulated signals R−Y, B−Y and the luminance signal Y are subjected to D/A conversion in D/A converters 235 236 237 Then, a burst circuit 240 receiving suitable burst control signals 272 and 273 and a D/A converter 242 insert 8 to 9 cycles in a back porch during a horizontal blanking period including the horizontal synchronizing signal, and output a burst signal. The luminance signal Y has the synchronizing signals superposed thereon by the D/A converter 235. The luminance signal Y 264, color-difference signals R−Y 265, B−Y 266 and the burst signal 267 are outputted with a predetermined phase relation and a predetermined timing and are combined into a composite video signal by a composite circuit 241B. This is shown as the last waveform in FIG. 2(d).

Figure 2E:
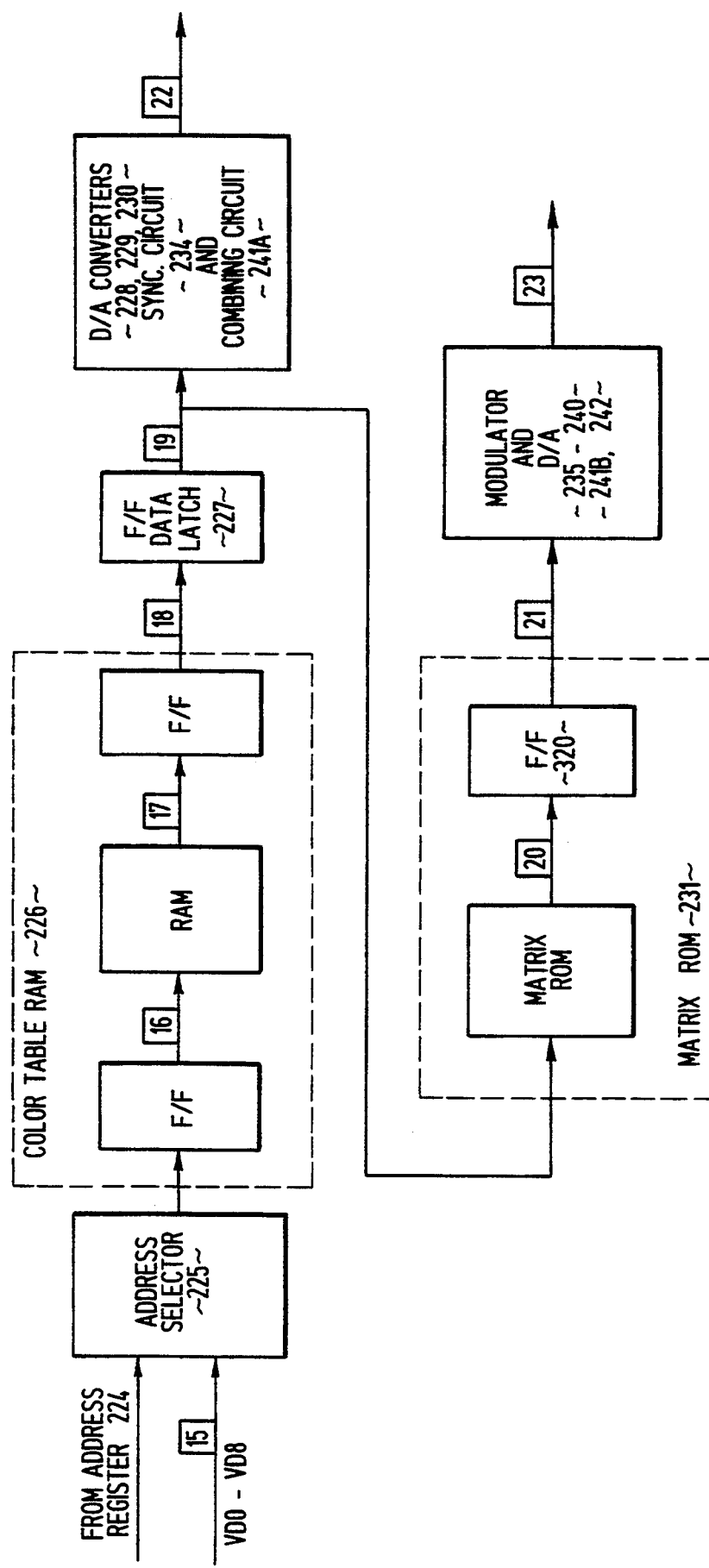
FIG. 2(e) is a circuit diagram of part of the generator of FIG. 2(a).

FIG. 2(e) shows a portion of one embodiment of the circuit of FIGS. 2(a)1 and 2(a)2 in somewhat greater detail, while FIG. 2(f) shows the signals existing at defined points in FIG. 2(e). As can be seen, color table RAM 226 can be composed of input flip-flop (F/F) supplying address signals to a RAM and output flip-flop (F/F) supplying digital R, G, B signals.

Data latch 227 may also be constituted by a set of flip-flops (F/F) which synchronizes the transmission of each set of digital R, G, B, signals to converters 228, 229 and 230 and to matrix ROM 231, to which they are applied as address signals.

Figure 3:
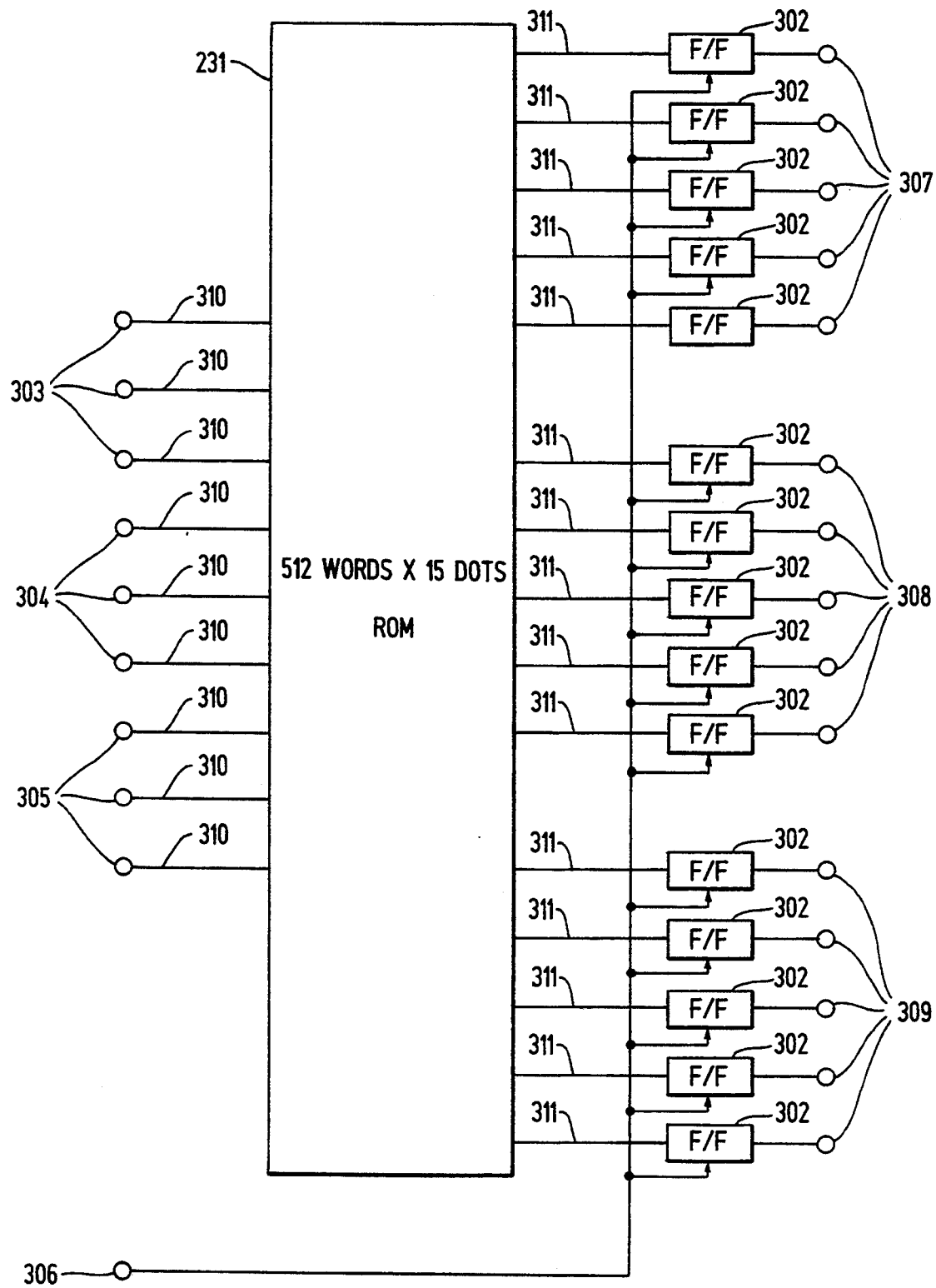
FIG. 3 is a diagram of a matrix ROM according to invention.

Matrix ROM 231 includes a set of synchronizing flip-flops (F/F), as shown at 302 in FIG. 3.

The output signals from ROM 231 are supplied to converter 235 and modulators 238 and 239.

The signals appearing at particular points in the circuit of FIG. 2(e) are shown in FIG. 2(f), the correspondence being indicated by appropriate reference numerals. The pixel clock signal shown in the first line of FIG. 2(f) is supplied to each circuit unit whose operation is to be synchronized to that signal. For the NTSC system, the pixel clock signal can have a frequency of 7.16 MHz.

The reference characters (A) and (B) in FIG. 2(f) shows the flow of signals relating to two successive pixels through the circuit of FIG. 2(e).

FIG. 2(b) shows a main part of the invention which corresponds to a part of the circuit of FIG. 2(a)2, but which operates with a reduced number of bits. The digital RGB color data is provided in 3 bits, or 1 bit each, at inputs 252, 253 and 254. Then 8 colors, or hues, in all can be represented as combinations of the three primary colors. The digital composite video data is constituted of 9 bits in all, that is, 3 bits for the Y signal, 3 bits for the B−Y signal, and 3 bits for the R−Y signal.

In FIG. 2(b), the digital RGB data at 252, 253, 254 are converted into digital composite video data 258, 259 and 260 through matrix converter 231. The digital RGB data and the digital composite video data are coordinated with each other as shown in the following table.

| Color | RGB Binary number | Y Binary | Y Decimal | R-Y Binary | R-Y Decimal | B-Y Binary | B-Y Decimal |
|---|---|---|---|---|---|---|---|
| White | 111 | 111 | 7 | 100 | 0 | 100 | 0 |
| Yellow | 110 | 110 | 6 | 101 | 1 | 000 | −3 |
| Cyan | 011 | 101 | 5 | 000 | −3 | 101 | 1 |
| Green | 010 | 100 | 4 | 001 | −2 | 001 | −2 |
| Magenta | 101 | 011 | 3 | 110 | 2 | 110 | 2 |
| Red | 100 | 010 | 2 | 111 | 3 | 010 | −1 |

-continued

| Color | RGB Binary number | Y Binary | Y Decimal | R - Y Binary | R - Y Decimal | B - Y Binary | B - Y Decimal |
|---|---|---|---|---|---|---|---|
| Blue | 001 | 001 | 1 | 010 | −1 | 110 | 3 |
| Black | 000 | 000 | 0 | 100 | 0 | 100 | 0 |

Moreover, the binary numbers in the above table represent the form in which data are treated in the video signal processor according to the present invention, while the decimal numbers represent the analog values after D/A conversion. The analog values are represented as decimal numbers to facilitate understanding of the present invention.

Y signal 258 of the digital composite video data is subjected directly to D/A conversion. However, R−Y signal 259 and B−Y signal 260 are subjected to balanced modulation digitally through the digital balanced modulators 238 and 239 before D/A conversion. Control signal generator 233 receives the oscillation signal at input terminal 255. Generator 233 and converter 235 receive a synchronizing signal from input terminal 251. The composite video signal formed in circuit 241B is delivered to an output terminal 269.

An exemplary embodiment of the matrix ROM 231 of FIG. 2(a)2 is shown in FIG. 3. In this embodiment, the digital RGB color data is provided in a total of 9 bits, or 3 bits for each primary color, via input terminals 303, 304 and 305 and lines 310. Then 512 hues all told can be represented by combinations of the three primary colors. However, the digital composite video data is constituted of 15 bits on output terminals 311, that is 5 bits for the Y signal, 5 bits for the R−Y signal and 5 bits for the B−Y signal.

In FIG. 3, ROM 231 is a semiconductor memory in which data for 512 colors, or hues, are stored beforehand.

A system for converting RGB color data into the luminance signal Y will now be described. As is well known, the luminance signal Y is represented by Equation (1).

$$Y = 0.3R + 0.59G + 0.11B \quad (1)$$

where $0 \leq R \leq 1$, $0 \leq G \leq 1$, $0 \leq B \leq 1$, $0 \leq Y \leq 1$. To work within the range of $0 \leq Y' \leq 31$, $0 \leq R' \leq 7$, $0 \leq G' \leq 7$, $0 \leq B' \leq 7$, Equation (1) is multiplied by 31/7 to convert into:

$$Y' = 1.33R' + 2.61G' + 0.49B' \quad (1)'$$

Next, the color-difference signal R−Y will be obtained through:

$$R - Y = R - (0.3R + 0.59G + 0.11B) \quad (2)$$
$$= 0.7R - 0.59G - 0.11B$$

where $0 \leq R \leq 1$, $0 \leq G \leq 1$, $0 \leq B \leq 1$, $-0.7 \leq R-Y \leq 0.7$. To work within the range of $-15 \leq R'-Y' \leq 15$, $0 \leq R' \leq 7$, $0 \leq G' \leq 7$, $0 \leq B' \leq 7$, Equation (2) is multiplied by 15/(0.7×7) to obtain:

$$R' - Y' = 2.14R' - 1.80G' - 0.34B' \quad (2)'$$

The color-difference signal B−Y is then obtained through:

$$B - Y = B - (0.3R + 0.59G + 0.11B) \quad (3)$$
$$= -0.3R - 0.59G + 0.89B$$

where $0 \leq R \leq 1$, $0 \leq G \leq 1$, $0 \leq B \leq 1$, $-0.89 \leq B-Y \leq 0.89$.

To work within the range of $-15 \leq B'-Y' \leq 15$, $0 \leq R' \leq 7$, $0 \leq G' \leq 7$, $0 \leq B' \leq 7$, the Equation (3) is multiplied by 15/(0.89×7) to obtain:

$$B' - Y' = -0.72R' - 1.42G' + 2.14B' \quad (3)'$$

Values of the luminance signal and the color-difference signals are obtained according to the Equations (1)', (2)' and (3)', and the values obtained through counting fractions over ½ as one and disregarding those equal to or less than ½ are given in the following table which shows, in the form of decimal values, data stored in semiconductor memory 231 for 50 exemplary colors out of the 512 possible colors. In this table, Y, R, G and B are substituted for Y', R', G' and B'.

| RGB (Decimal) | Color | Y (Decimal) | R - Y (Decimal) | B - Y (Decimal) |
|---|---|---|---|---|
| 000 | Black | 0 | 0 | 0 |
| 001 | Dark blue | 0 | 0 | 2 |
| 002 | ↓ | 1 | −1 | 4 |
| 003 | ↓ gradually | 1 | −1 | 6 |
| 004 | ↓ change | 2 | −1 | 9 |
| 005 | ↓ | 2 | −2 | 11 |
| 006 | Bright blue | 3 | −2 | 13 |
| 007 | Blue | 3 | −2 | 15 |
| 100 | Dark red | 1 | 2 | −1 |
| 200 | ↓ | 3 | 4 | −1 |
| 300 | ↓ gradually | 4 | 6 | −2 |
| 400 | ↓ change | 5 | 9 | −3 |
| 500 | ↓ | 7 | 11 | −4 |
| 600 | Bright red | 8 | 13 | −4 |
| 700 | Red | 9 | 15 | −5 |
| 101 | Dark Magenta | 2 | 2 | 1 |
| 202 | ↓ | 4 | 4 | 3 |
| 303 | ↓ gradually | 5 | 5 | 4 |
| 404 | ↓ change | 7 | 7 | 6 |
| 505 | ↓ | 9 | 9 | 7 |
| 606 | Bright Magenta | 11 | 11 | 9 |
| 707 | Magenta | 13 | 13 | 10 |
| 010 | Dark Green | 3 | −2 | −1 |
| 020 | ↓ gradually | 5 | −4 | −3 |
| 030 | ↓ change | 8 | −5 | −4 |
| 040 | ↓ | 10 | −7 | −6 |
| 050 | ↓ | 13 | −9 | −7 |
| 060 | Bright green | 16 | −11 | −9 |
| 070 | Green | 18 | −13 | −10 |
| 011 | Dark cyan | 3 | −2 | 1 |
| 022 | ↓ | 6 | −4 | 1 |
| 033 | ↓ gradually | 9 | −6 | 2 |
| 040 | ↓ change | 12 | −9 | 3 |
| 055 | ↓ | 16 | −11 | 4 |
| 066 | Bright cyan | 19 | −13 | 4 |
| 077 | Cyan | 22 | −15 | 5 |
| 110 | Dark yellow | 4 | 0 | −2 |
| 220 | ↓ | 8 | 1 | −4 |
| 330 | ↓ gradually | 12 | 1 | −6 |
| 440 | ↓ change | 16 | 1 | −9 |
| 550 | ↓ | 20 | 2 | −11 |
| 660 | Bright yellow | 24 | 2 | −13 |

-continued

| RGB (Decimal) | Color | Y (Decimal) | R-Y (Decimal) | B-Y (Decimal) |
|---|---|---|---|---|
| 770 | Yellow | 28 | 2 | −15 |
| 111 | Dark gray | 4 | 0 | 0 |
| 222 | ↓ gradually | 9 | 0 | 0 |
| 333 | ↓ change | 13 | 0 | 0 |
| 444 | ↓ | 18 | 0 | 0 |
| 555 | ↓ | 22 | 0 | 0 |
| 666 | Bright gray | 27 | 0 | 0 |
| 777 | White | 31 | 0 | 0 |

Decimals numbers are shown in the above table so that the conversions of the R signal, G signal and B signal to Y signal, R−Y signal and B−Y signal, respectively, are better understood. In the circuit itself, or course, the data are represented as binary numbers.

Figure 4:
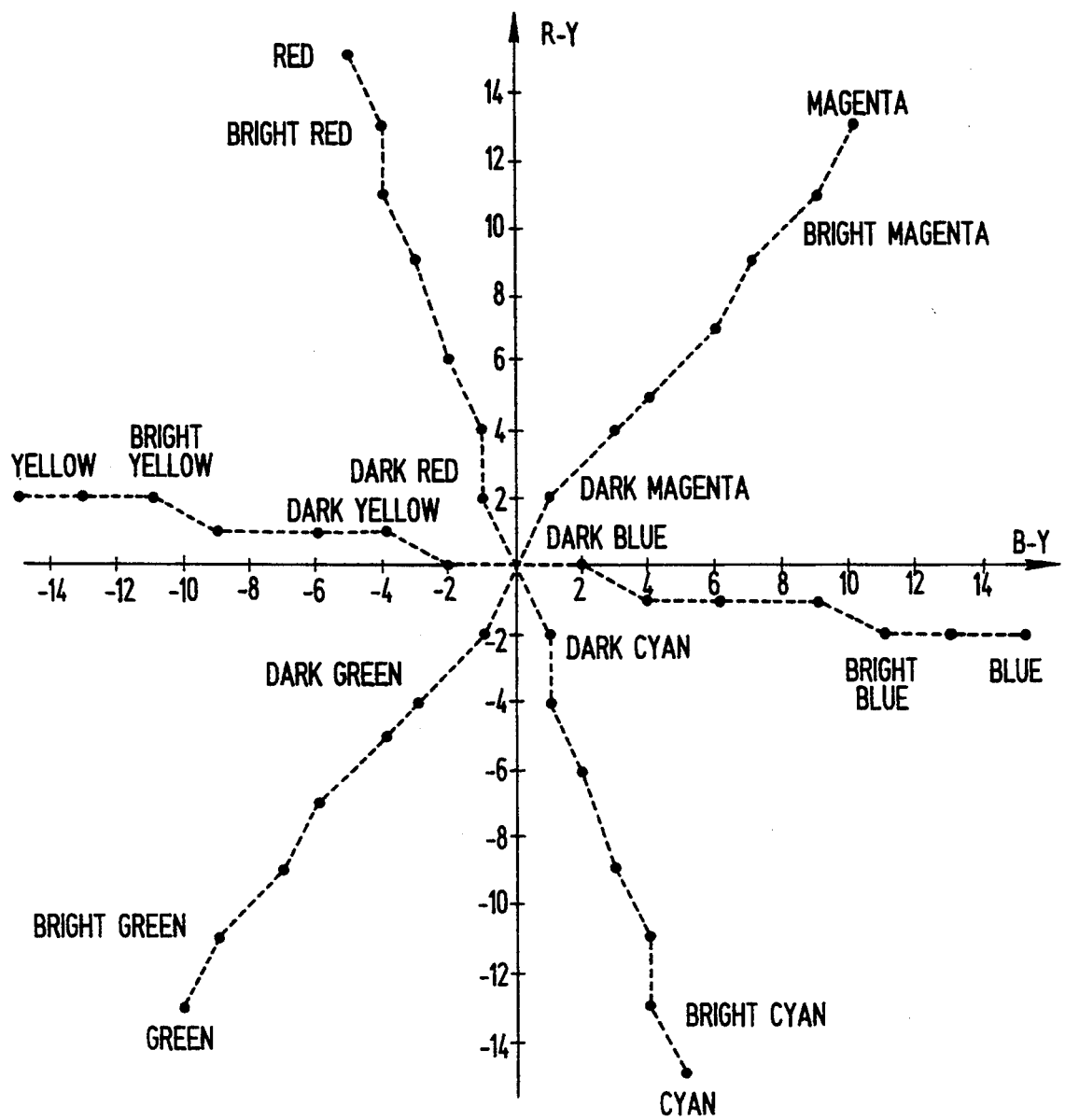
FIG. 4 is a diagram showing the vectorial result produced by the matrix ROM of FIG. 3.

FIG. 4 shows a so-called vectorial result obtained through converting the digital RGB color data of the aforementioned typical 50 colors into digital composite video data.

Namely, in FIG. 4, the abscissa shows the B−Y signal, the ordinate shows the R−Y signal. The values of the B−Y signal and the R−Y signal in the above table are plotted. As is clear from FIG. 4, the combination of the values of each signal allows the variety of coloration.

The digital RGB color data are applied to nine address numerical signal (address signal) input terminals of semiconductor memory 231. By a reading operation on the semiconductor memory, the luminance signal (Y signal) in 5 bits,
the red signal (R−Y signal) in 5 bits,
the blue signal (B−Y signal) in 5 bits are output to respective sets of the 15 signal output terminals 311.

Digital composite video data coordinating with the digital RGB color data is obtainable through such circuit configuration. Devices 302 in FIG. 3 are flip-flops for adjusting a time lag between mutual data by latching the data per pixel in synchronism with pixel clock signal CK supplied to input 306 obtained from logic controller 232 of FIG. 2(a)1. If the read time of the semiconductor memory is sufficiently less than one pixel period of the data, then the flip-flops 302 are not required. Respective groups of flip-flops 302 supply digital Y data 307, digital R−Y data 308 and digital B−Y data 309.

Next, a first embodiment of modulators 238 and 239 of FIG. 2(b) will be described by reference to FIG. 5 which shows a digital balanced modulator for processing the R−Y signal as an example. The illustrated modulator receives a 3-bit binary signal based on the single-bit RGB values described earlier rather than the 3-bit values described with reference to FIG. 3. The unmodulated R−Y bits are supplied to unmodulated data input terminals 530 from ROM 231 of FIG. 2(b). Modulation clock pulses are applied to an input terminal 531. Modulated data appear at output terminals 532 and are supplied to D/A converter 236 of FIG. 2(b). Each input terminal 530 is connected to a respective output terminal 532 via a respective logic composed of two inverters 533, two AND gates 534 and an OR gate 532 connected so that a logic 1 appears at output terminal 532 whenever the signals at terminals 530 and 531 have the same logic state. Thus, when a logic 1 is present at modulation clock input terminal 531, a signal of the same logical value as the data input at unmodulated data input terminal 530 is output to the output terminal 532. However, when a logic 0 is present at the modulation clock input terminal 531, a signal inverse in logical value to the data input at unmodulated data input terminal 530 is output to the output terminal 532. The relation between data before modulation and after modulation are shown in the following table.

| Color | R-Y before modulation | | R-Y after modulation | | | |
|---|---|---|---|---|---|---|
| | | | Modulation clock = 1 | | Modulation clock = 0 | |
| | Binary | Decimal | Binary | Decimal | Binary | Decimal |
| White | 100 | 0 | 100 | 0 | 011 | 0 |
| Yellow | 101 | 1 | 201 | 1 | 010 | −1 |
| Cyan | 000 | −3 | 000 | −3 | 111 | 3 |
| Green | 001 | −2 | 001 | −2 | 110 | 2 |
| Magenta | 110 | 2 | 110 | 2 | 001 | −2 |
| Red | 111 | 3 | 111 | 3 | 000 | −3 |
| Blue | 010 | −1 | 010 | −1 | 101 | 1 |
| Black | 100 | 0 | 100 | 0 | 011 | 0 |

Figure 5:
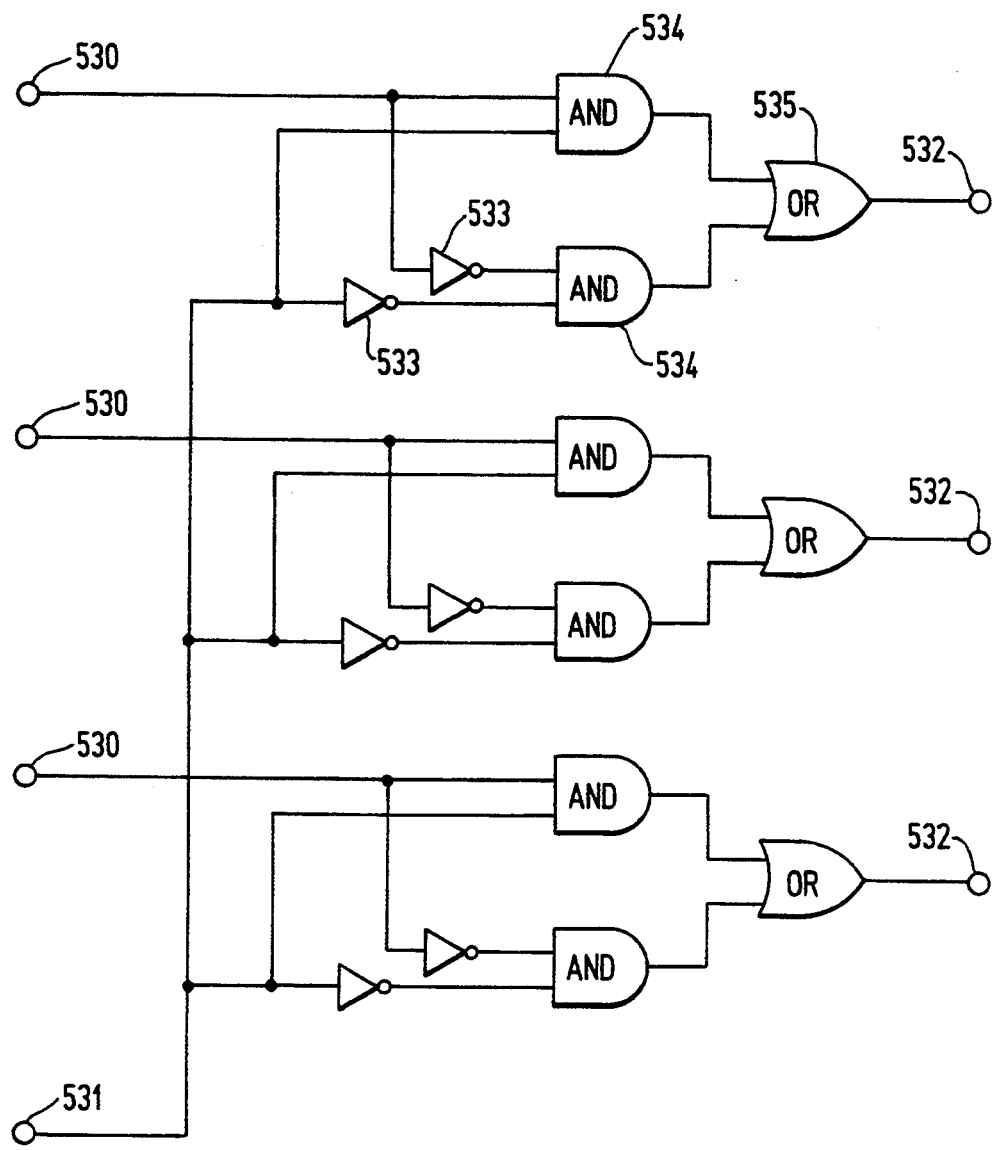
FIG. 5 is a circuit diagram of a first embodiment of a balanced modulator according to the invention.
Figure 7A:
FIGS. 7(a), 7(b), 7(c) and 7(d) are waveform diagrams showing an operating state of a video signal processor having the balanced modulator of FIG. 5.
Figure 7B:
Figure 7C:
Figure 7D:

FIGS. 7(a)–7(d) are waveform diagrams showing the operating conditions of the circuit of FIG. 5. When the clock of FIG. 7(a) is input to terminal 531 of FIG. 5, the normal logical value or inverse logical value is output from terminal 532 as shown in FIG. 7(b). The related operation of the B−Y modulator is shown in FIGS. 7(c) and 7(d).

Figure 6A:
FIGS. 6(a), 6(b) and 6(c) are waveform diagrams showing an operating state of the balanced modulator of FIG. 5.
Figure 6B:
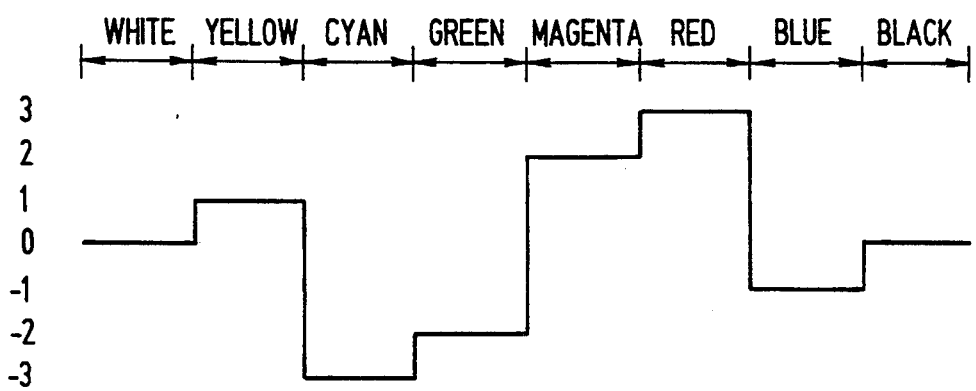
Figure 6C:
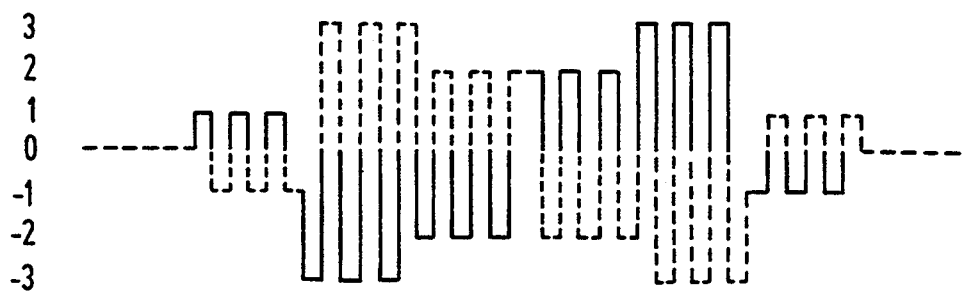

FIGS. 6(a)–6(c) show the operating conditions of the circuit of FIG. 5. When the clock of FIG. 6(a) is input to terminal 531 of FIG. 5 and data (represented as decimal numbers) as shown in FIG. 6(b) are input to terminals 530, the data as shown in FIG. 6(c) are output to terminals 532. Although the data are represented as decimal numbers in the above table and in FIGS. 6(a)–6(c), the data are actually present in binary form in the circuit.

A color-difference subcarrier (3.58 MHz in the NTSC system, or 4.43 MHz in the PAL system) is inputted to the modulation clock input terminal 531, thereby obtaining a color-difference signal output in balanced modulation.

Two color-difference signal subcarriers mutually shifted in phase by 90° will be obtainable through dividing a clock signal twice, for example as shown in FIG. 2(c). By using one as a modulation clock of the R−Y signal and the other as a modulation clock of the B−Y signal, modulation outputs of the R−Y signal and B−Y signal are obtainable as shown in FIGS. 6(a)–6(c).

Next, a second embodiment of the modulators 238 and, 239, corresponding to the circuit of FIG. 2(a)2, will be described. A digital balanced modulator will be described with reference to the R−Y signal as an example.

Figure 8:
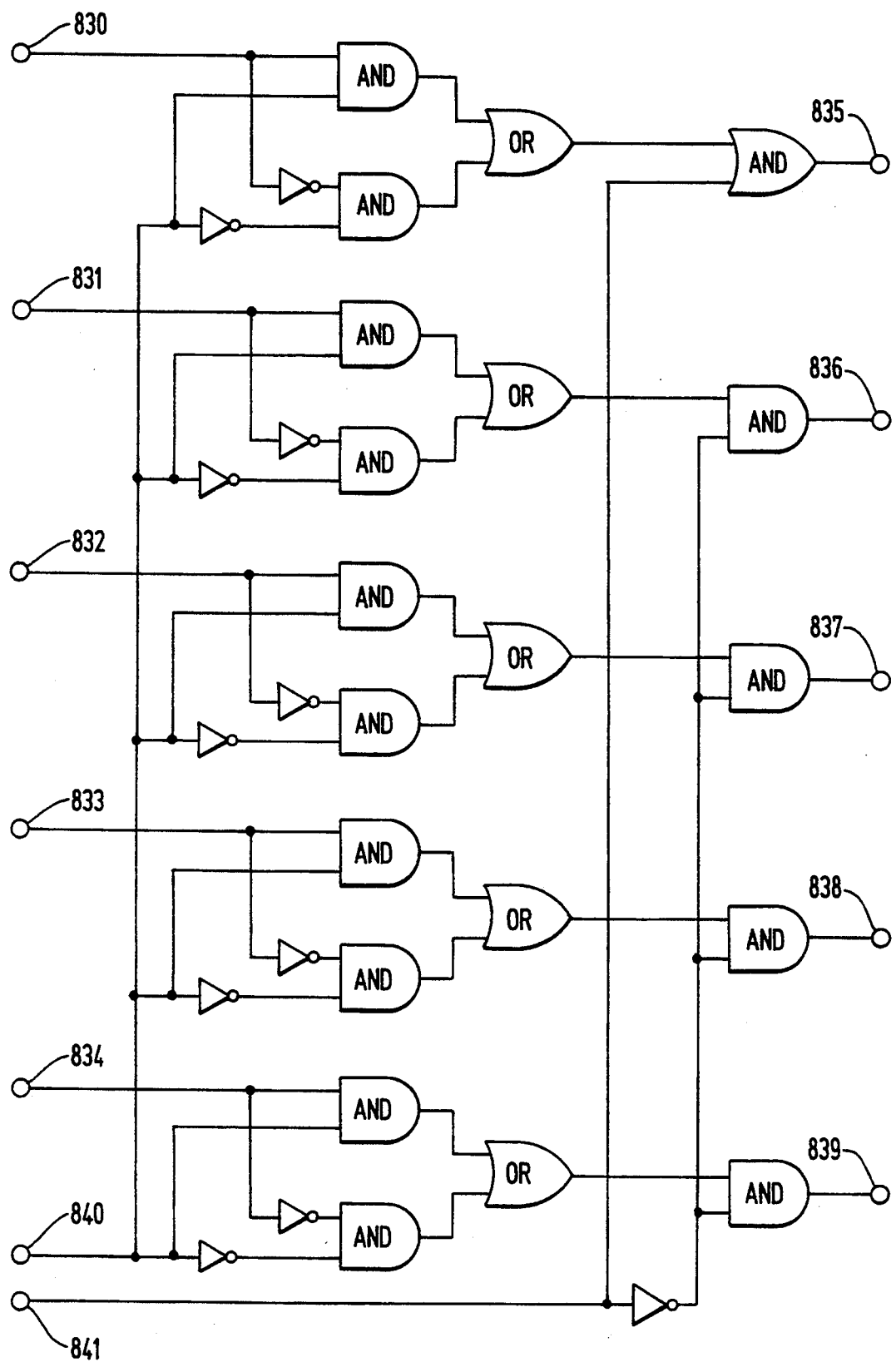
FIG. 8 is a circuit diagram representing a second embodiment of the balanced modulator of the invention.

FIG. 8 shows this example of a 5-bit digital balanced modulator. Another circuit exactly the same as that of FIG. 8 is required by the B−Y signal.

Unmodulated data bits from ROM 231 are applied to data input terminals 830 to 834, with the most significant bit being applied to terminal 830 and bits of decreasing significance being applied to respective ones of terminals 831–834, terminal 834 receiving the least significant bit. Modulated data bits are supplied via output terminals 835–839 to D/A converter 236. The most significant output bit appears at terminal 835 and bits of decreasing significance appear at respective ones of terminals 836, 837, 838 and 839. A modulation clock signal is applied to input terminal 840 and a modulation zero signal is applied to input terminal 841. When the logic value of the modulation signal is 1, a signal of the same logical value as the input signal is output to the respective output terminal. However, when the logic value of the modulation clock signal is 0, a signal inverse in logical value to the input signal is output to the respective output terminal. Then, when the logic value of the modulation zero signal is 1, terminal 835 outputs a logic 1 and terminals 836 to 839 output logic 0 regardless of the input state.

The following table shows the relation between: color-difference signals before modulation which is inputted to the balanced modulator of FIG. 8; a color-difference signal subcarrier working as the modulation clock; a modulation zero signal generated at a phase shift point of the color-difference subcarrier; and analog values after subjecting the color-difference signals to balanced modulation and D/A conversion in the D/A converter.

Figure 12A:
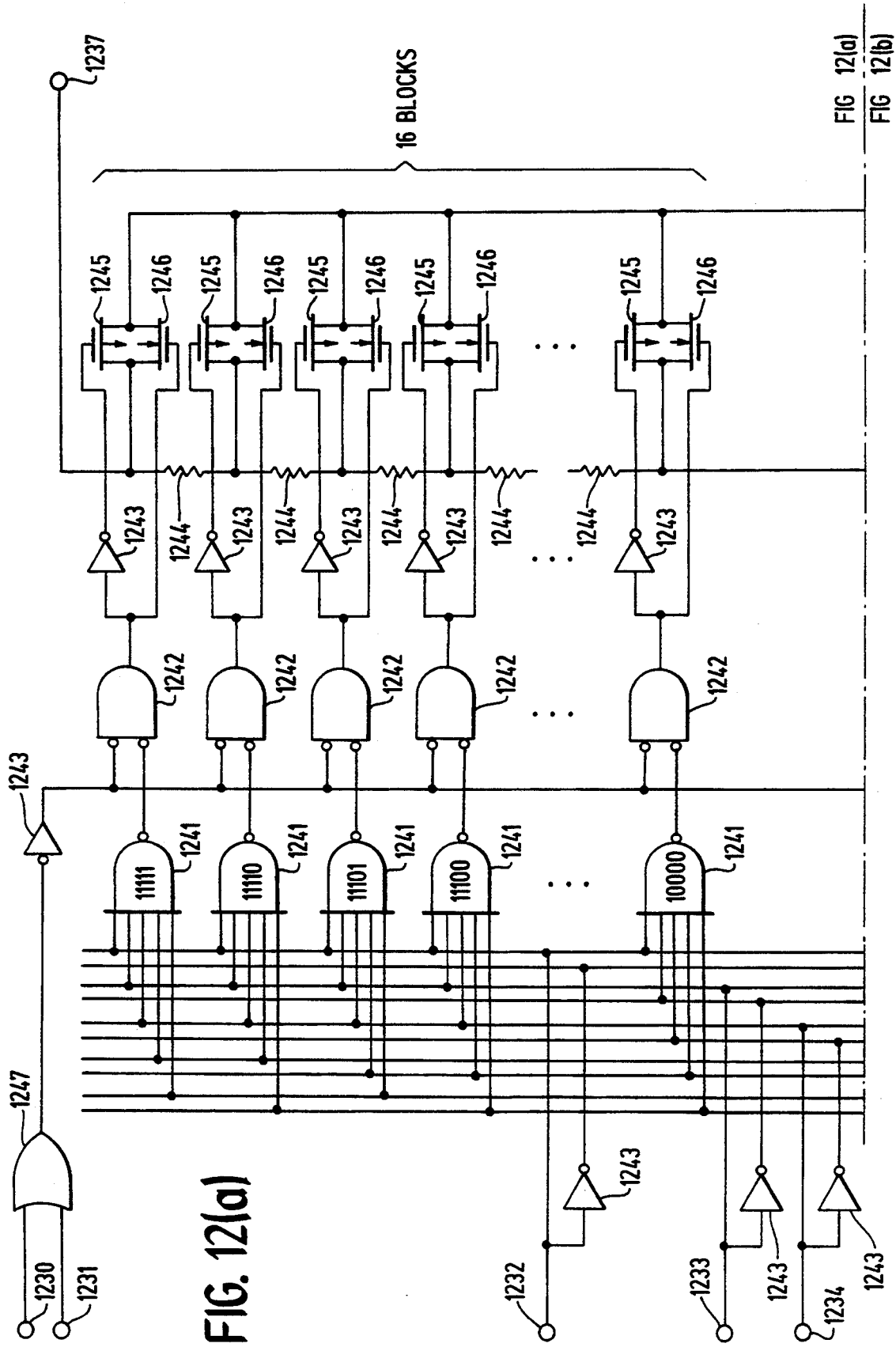
FIGS. 12(a) and 12(b) are circuit diagrams showing a digital-analog converter according to the invention.

The outputs 835, 836, 837, 838 and 839 are input to terminals 1232, 1233, 1234, 1235 and 1236, respectively, and modulation zero clock 841 is input to terminal 1231 of FIG. 12(a), described as follows.

Figure 9A:
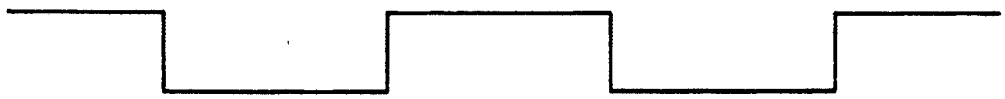
FIGS. 9(a), 9(b), 9(c), 9(d), 9(e) and 9(f) are waveform diagrams showing an operating state of the balanced modulator of FIG. 8.
Figure 9B:
Figure 9C:
Figure 9D:
Figure 9E:
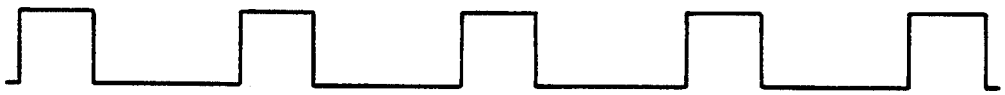
Figure 9F:
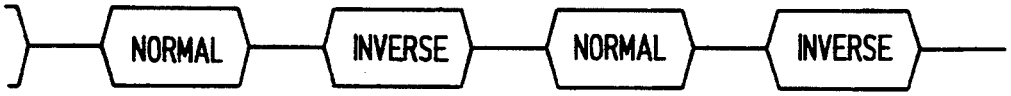

FIGS. 9(a), 9(b), 9(d), and 9(e) are generated by dividing in the control signal generator 233. The frequency applied to terminal 255 would equal 21.47727 MHz in the NTSC system and would be produced by oscillator 233A of FIG. 2(a)2. The color-difference signals subjected to balanced modulation with the pulses of FIG. 9(a) as R−Y modulation clock signal, the pulses of FIG. 9(b) as R−Y modulation zero signal, the pulses of FIG. 9(d) as B−Y modulation clock signal, and the pulses of FIG. 9(e) as B−Y modulation zero signal are then subjected to D/A conversion, thereby obtaining the R−Y analog output of FIG. 9(c) and the B−Y analog output of FIG. 9(e). A balanced modulator capable of outputting a ternary value having a positive value, a zero or mid-point value, or a negative value is realized by such action. Here, as will be apparent from FIGS. 9(a)–9(f), the R−Y modulation clock and the B−Y modulation clock are color-difference signal subcarriers phase shifted by 90° each other.

Examples of the burst circuit 240 and the burst D/A converter 242 of FIG. 2(a)2 will be described next with reference to FIG. 10.

A burst high level is impressed on input terminal

| Modulation zero input | Modulation clock | Data before modulation | | | | | Analog value after D conversion of data after modulation (V) |
| --- | --- | --- | --- | --- | --- | --- | --- |
| | | 830 | 831 | 832 | 833 | 834 | |
| 0 | 0 | 0 | 0 | 0 | 0 | 0 | −1.5 |
| 0 | 0 | 0 | 0 | 0 | 0 | 1 | −1.4 |
| 0 | 0 | 0 | 0 | 0 | 1 | 0 | −1.3 |
| 0 | 0 | 0 | 0 | 0 | 1 | 1 | −1.2 |
| 0 | 0 | 0 | 0 | 1 | 0 | 0 | −1.1 |
| 0 | 0 | 0 | 0 | 1 | 0 | 1 | −1.0 |
| 0 | 0 | 0 | 0 | 1 | 1 | 0 | −0.9 |
| 0 | 0 | 0 | 0 | 1 | 1 | 1 | −0.8 |
| 0 | 0 | 0 | 1 | 0 | 0 | 0 | −0.7 |
| 0 | 0 | 0 | 1 | 0 | 0 | 1 | −0.6 |
| 0 | 0 | 0 | 1 | 0 | 1 | 0 | −0.5 |
| 0 | 0 | 0 | 1 | 0 | 1 | 1 | −0.4 |
| 0 | 0 | 0 | 1 | 1 | 0 | 0 | −0.3 |
| 0 | 0 | 0 | 1 | 1 | 0 | 1 | −0.2 |
| 0 | 0 | 0 | 1 | 1 | 1 | 0 | −0.1 |
| 0 | 0 | 0 | 1 | 1 | 1 | 1 | 0.0 |
| 0 | 0 | 1 | 0 | 0 | 0 | 0 | 0.0 |
| 0 | 1 | 1 | 0 | 0 | 0 | 1 | +0.1 |
| 0 | 1 | 1 | 0 | 0 | 1 | 0 | +0.2 |
| 0 | 1 | 1 | 0 | 0 | 1 | 1 | +0.3 |
| 0 | 1 | 1 | 0 | 1 | 0 | 0 | +0.4 |
| 0 | 1 | 1 | 0 | 1 | 0 | 1 | +0.5 |
| 0 | 1 | 1 | 0 | 1 | 1 | 0 | +0.6 |
| 0 | 1 | 1 | 0 | 1 | 1 | 1 | +0.7 |
| 0 | 1 | 1 | 1 | 0 | 0 | 0 | +0.8 |
| 0 | 1 | 1 | 1 | 0 | 0 | 1 | +0.9 |
| 0 | 1 | 1 | 1 | 0 | 1 | 0 | +1.0 |
| 0 | 1 | 1 | 1 | 0 | 1 | 1 | +1.1 |
| 0 | 1 | 1 | 1 | 1 | 0 | 0 | +1.2 |
| 0 | 1 | 1 | 1 | 1 | 0 | 1 | +1.3 |
| 0 | 1 | 1 | 1 | 1 | 1 | 0 | +1.4 |
| 0 | 1 | 1 | 1 | 1 | 1 | 1 | +1.5 |
| 1 | 1 or 0 | 1 or 0 | 1 or 0 | 1 or 0 | 1 or 0 | 1 or 0 | 0.0 |

Figure 11A:
FIGS. 11(a), 11(b) and 11(c) are waveform diagrams showing an operating state of the color burst signal generator of FIG. 10.
Figure 11B:
Figure 11C:
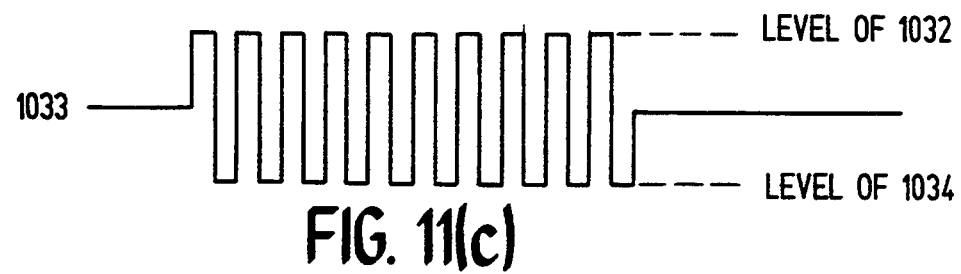

Accordingly, when the logic value of the modulation zero input is 1, the analog value output by the D/A converter will be zero. However, the table relates to the case where the D/A converter output varies between −1.5(V) to 1.5(V), and the D/A conversion output when the logic value of the modulation zero input is 1 is defined generally as: (maximum output level of D/A conversion output−minimum output level of D/A conversion output)/2, namely at the mid-point of D/A conversion output range. A frequency equal to six times, for example, the frequency of the color-difference signal subcarrier is applied to a clock input terminal of generator 233 of FIG. 2(a)2 and the pulses of 1032, and, a burst low level is impressed on input terminal 1034. A mid-point voltage of the burst high level and the burst low level is generated at the connection point of resistors 1035 and 1036 which are given appropriate resistance values. A signal (shown in FIG. 11(a)) whose logic value becomes 0 only during the period of generating a burst signal is applied to input terminal 1030, and a burst generating subcarrier signal (shown in FIG. 11(b)) is applied to input terminal 1031. Then an analog burst data signal (shown in FIG. 11(c)) is obtainable at output terminal 1033 through the operation shown in the following table.

| Burst control (1030) | Subcarrier (1031) | Q1 (1040) | Q2 (1041) | Q3 (1042) | Q4 (1043) | Q5 (1044) | Q6 (1045) | Output voltage (1033) |
|---|---|---|---|---|---|---|---|---|
| 0 | 0 | OFF | | | OFF | ON | | Low level (1034) |
| 0 | 1 | ON | | | OFF | OFF | | High level (1032) |
| 1 | 0 | ON | | | ON | OFF | | Mid-point level |
| 1 | 1 | OFF | | | ON | OFF | | Mid-point level |

Figure 10:
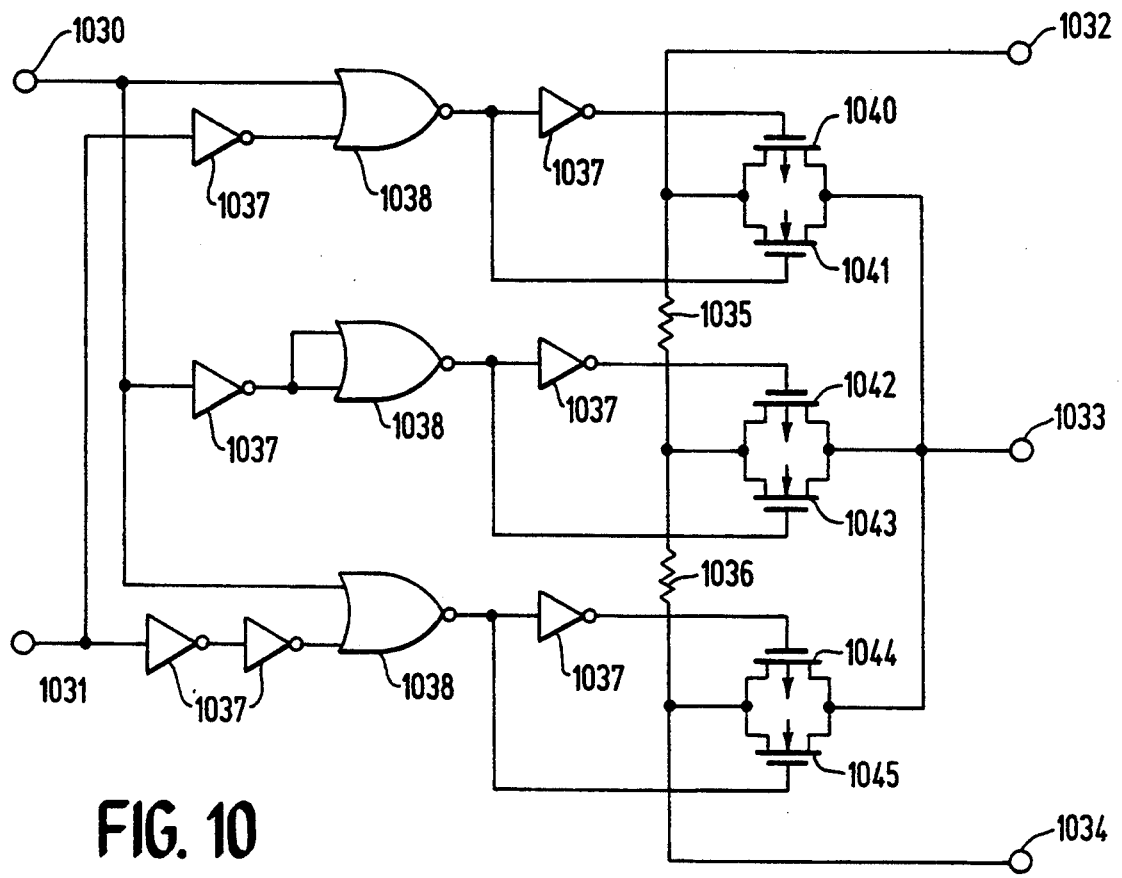
FIG. 10 is a circuit diagram showing a color burst signal generator according to the invention.

The circuit of FIG. 10 is composed of inverters 1037, NOR gates 1038 P-channel Metal Oxide Semiconductor Field Effect Transistors (MOSFET) 1040, 1042 and 1044, and N-channel MOSFETs 1041, 1043 and 1045. A transmission gate is composed of a pair of MOSFETs.

Figure 12B:
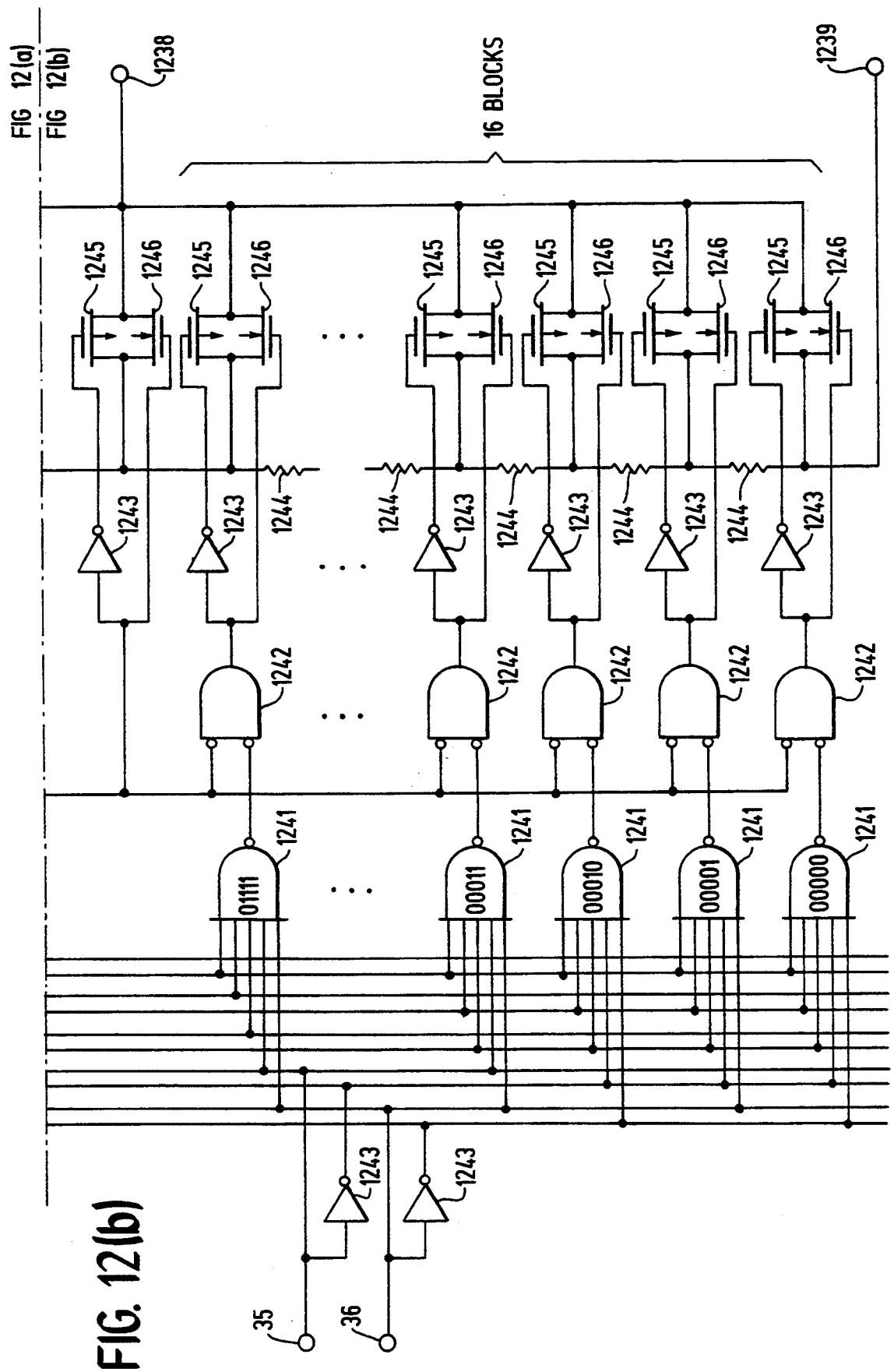
Figure 13A:
FIGS. 13(a), 13(b), 13(c), 13(d) and 13(e) are waveform diagrams showing an operating state of the digital-analog converter of FIG. 12.
Figure 13B:
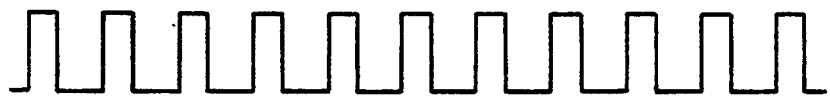
Figure 13C:
Figure 13D:
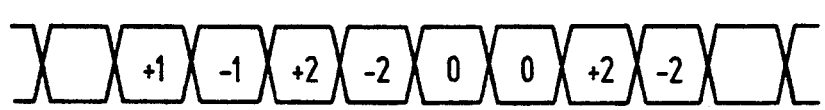
Figure 13E:
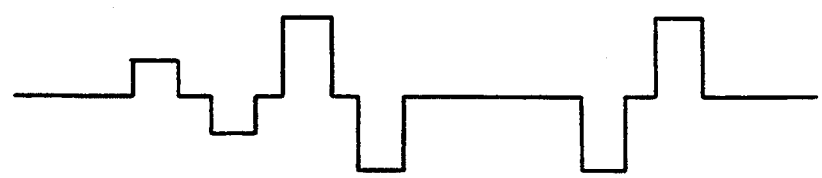

Next, examples of the D/A converters 236 and 237 of FIG. 2(a)2 will be described with reference to an example shown in FIGS. 12(a) and 12(b).

A blanking signal for showing the display term is input to terminal 1230. This signal is shown as the first waveform of FIG. 2(d). When the blanking signal is logic 1, the display term is in the OFF state. The same modulation clock as that at terminal 841 of FIG. 8 is input to terminal 1231. The modulated color difference signal, which is outputted to terminals 835 to 839 of FIG. 8, is input to terminals 1232 to 1236, as mentioned above.

Terminals 1230 and 1231 are connected to inputs of a NOR gate 1247 the output of which is connected to a first inverter 1243.

The converter includes a decoder composed of five further inverters 1243 and thirty-two NAND gates, 1041. The decoder is followed by an array of NOR gates 1042 each having one input connected to the output of a respective NAND gate 1241 and one input connected to the output of the first inverter 1243.

The output of each NOR gate 1242 is connected to a respective transmission gate composed of an inverter 1243, a P-channel MOSFET 1245 and an N-channel MOSFET 1246. A further transmission gate is connected directly to the output of the first inverter 1243 which is connected to the output of NOR gate 1247.

Depending on the binary values applied to terminals 1232 to 1236, one, and only one, NAND gate 1241 will output a logic zero to its associated NOR gate 1242.

NOR gate 1247 outputs logic zero when the display term is in the OFF state or the chrominance subcarrier value is changing. Therefore, NOR gate 1247 outputs logic 1 only when the display term is in the ON state and the chrominance subcarrier value is not changing.

Each NOR gate 1242 outputs a logic 1 only when both of its inputs are simultaneously receiving a logic zero. This occurs when the output of NOR gate 1247 is a logic 1, which is inverted by the first inverter 1243, and the output of the associated NAND gate 1241 is a logic zero. Each transmission gate 1243, 1244, 1245 is rendered conductive in response to receipt of a logic 1.

A voltage divider composed of a series array of resistors 1244 is connected between terminals 1237 and 1239 supplying maximum and minimum analog voltages, respectively.

Each tap of the voltage divider is connected to one end of the current path defined by a respective one of the transmission gates. The further transmission gate is connected to the center point of the voltage divider. The other end of the current path of each transmission gate is connected to an output terminal 1238.

When the output of NOR gate 1247 is logic zero, a logic 1 is applied, via first inverter 1243, to the further transmission gate so that the center, or midpoint, analog voltage appears at terminal 1238.

When the output of NOR gate 1247 is logic 1, one of the NOR gates 1242 receives a logic zero from its associated NAND gate 1241 and therefore outputs a logic 1, so that a respective one of the transmission gates is turned ON. Thus, terminal 1238 is placed at a potential which constitutes an analog representative of the digital color difference signal value. The digital data before and after balanced modulation are shown in the following table.

| Digital value before modulation | | Digital value after modulation | | | |
|---|---|---|---|---|---|
| | | Modulation clock = 1 | | Modulation clock = 0 | |
| Binary | Decimal | Binary | Decimal | Binary | Decimal |
| 11111 | +15 | 11111 | +15 | 00000 | −15 |
| 11110 | +14 | 11110 | +14 | 00001 | −14 |
| 11101 | +13 | 11101 | +13 | 00010 | −13 |
| 11100 | +12 | 11100 | +12 | 00011 | −12 |
| 11011 | +11 | 11011 | +11 | 00100 | −11 |
| 11010 | +10 | 11010 | +10 | 00101 | −10 |
| 11001 | +9 | 11001 | +9 | 00110 | −9 |
| 11000 | +8 | 11000 | +8 | 00111 | −8 |
| 10111 | +7 | 10111 | +7 | 01000 | −7 |
| 10110 | +6 | 10110 | +6 | 01001 | −6 |
| 10101 | +5 | 10101 | +9 | 01010 | −5 |
| 10100 | +4 | 10100 | +4 | 01011 | −4 |
| 10011 | +3 | 10011 | +3 | 01100 | −3 |
| 10010 | +2 | 10010 | +2 | 01101 | −2 |
| 10001 | +1 | 10001 | +1 | 01110 | −1 |
| 10000 | 0 | 10000 | 0 | 01111 | 0 |
| 01111 | 0 | 01111 | 0 | 10000 | 0 |
| 01110 | +1 | 01110 | −1 | 10001 | +1 |
| 01101 | −2 | 01101 | −2 | 10010 | +2 |
| 01100 | −3 | 01100 | −3 | 10011 | +3 |
| 01011 | −4 | 01011 | −4 | 10100 | +4 |
| 01010 | −5 | 01010 | −5 | 10101 | +5 |
| 01001 | −6 | 01001 | −6 | 10110 | +6 |
| 01000 | −7 | 01000 | −7 | 10111 | +7 |
| 00111 | −8 | 00111 | −8 | 11000 | +8 |
| 00110 | −9 | 00110 | −9 | 11001 | +9 |
| 00101 | −10 | 00101 | −10 | 11010 | +10 |
| 00100 | −11 | 00100 | −11 | 11011 | +11 |
| 00011 | −12 | 00011 | −12 | 11100 | +12 |
| 00010 | −13 | 00010 | −13 | 11101 | +13 |
| 00001 | −14 | 00001 | −14 | 11110 | +14 |
| 00000 | −15 | 00000 | −15 | 11111 | +15 |

When the blanking signal at terminal 1230 is logic 1 and the modulation zero signal at terminal 1231 is logic 1, the digital-analog converter outputs a voltage at the mid-point between the high level and the low level analog voltages applied to input terminals 1237 and 1239, respectively. Otherwise, one set of P-channel MOSFET 1245 and N-channel MOSFET 1246, determined according to the values of the digital data after balanced modulation applied to terminals 1232 to 1236 becomes conductive, and the corresponding analog level is output. When there is no color-difference component present (or at the time of achromatic color such as black or the like), the digital data before balanced modulation becomes 10000 (binary). The data becomes 10000 (binary) and 01111 (binary) through balanced modulation and the mid-point value between high level and low level is output by the digital-analog modulator or as in the case of blanking.

Output waveforms are shown in FIGS. 13(a)–13(e), it being understood that the phase of the analog output waveform is determined by the phase of the modulation zero input signal and is not related to the amplitude of the digital data. Further, since the switching for balanced modulation is carried out always in a modulation zero state, incorrect data will never be output transiently.

Described next is an example of the synthesizing, or combining, circuit 241B of FIG. 2(a)2. As shown in FIG. 2(a)2, a digital Y signal, a modulated digital R−Y signal, a modulated digital B−Y signal and a digital color burst signal are converted into analog signals in respective independent digital-analog converters and are combined in the circuit 241 B, and a composite video signal is output.

Figure 14:
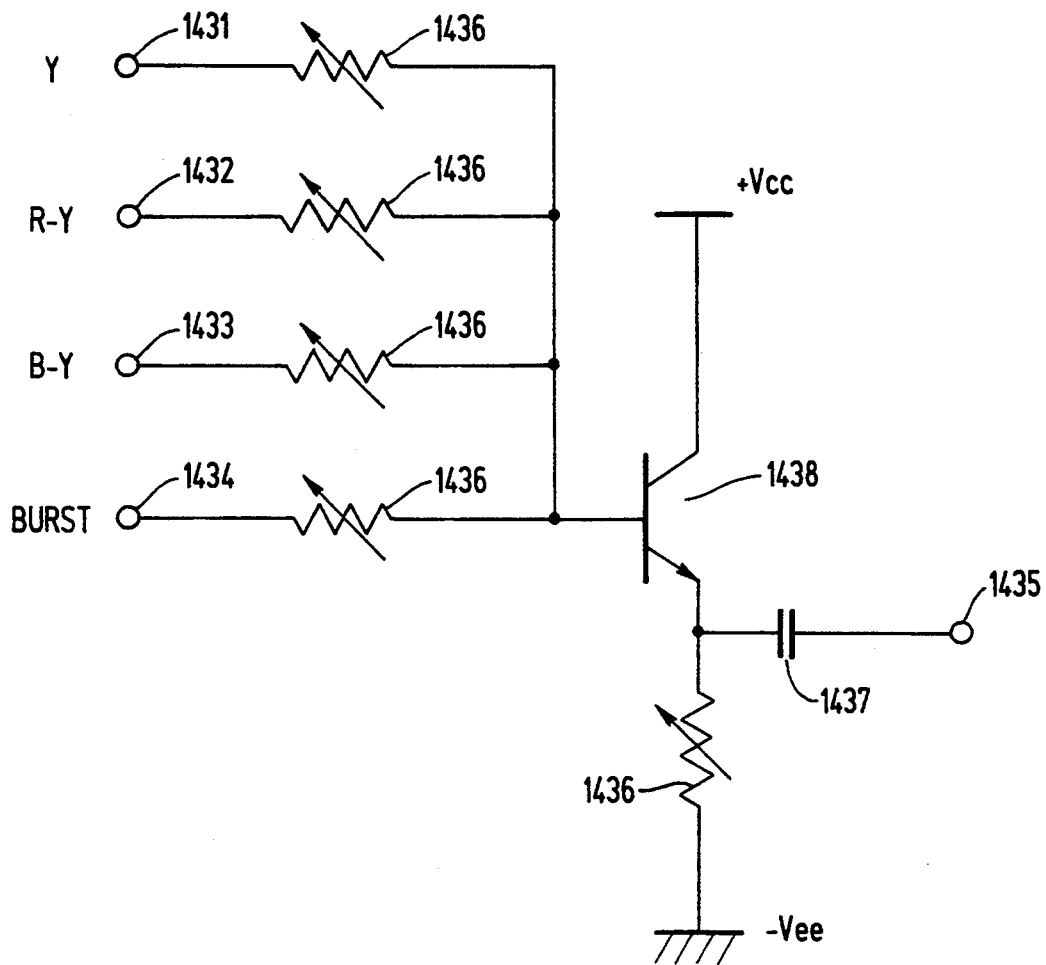
FIG. 14 is a circuit diagram of a composite circuit according to the invention.

FIG. 14 is a circuit diagram representing an example of the circuit 241B of FIG. 2(a)2. The aforementioned Y signal, R−Y signal, B−Y signal and color burst signal converted into analog values are inputted at respective input terminals 1431, 1432, 1433 and 1434 and combined by resistance elements 1436 and a transistor 1438, and a composite video signal is output to a terminal 1435. Transistor 1438 is connected to output terminal 1435 via a high pass filter composed of a resistor 1436 and a capacitor 1437. Resistor 1436 is connected in the emitter path of transistor 1438.

The resistance value of each element 1436 can be adjusted and thus the phase,and amplitude of each input signal can be adjusted independently, thereby realizing adjustment and correction of tint.

As described above, according to the invention, the digital RGB color data can be converted directly into digital composite video data without converting into an analog signal, so that a conversion having high stability and precision may be realized. Further, while a D/A converter, an analog adder-subtractor and an A/D converter are required in the prior art, these are replaced by a semiconductor memory according to the invention. Therefore, miniaturization, low power consumption and high-speed operation of the processor may be realized.

Then, composite video data producing a hue different from that of given RGB color data is obtainable by modifying the storage contents of the semiconductor memory. Therefore, another effect is ensured such that the data may be adjusted independently for every indicatable color or further also independently for Y signal, R−Y signal, and B−Y signal.

Further, according to the first embodiment of the modulator of the invention, since two color difference signals can be subjected to balanced modulation through a digital circuit, the video signal processor is capable of generating a high quality composite video signal which is precise both in amplitude and phase angle which has never been obtainable hitherto even by configuring an MOS digital integrated circuit provided for this purpose.

According to the second embodiment of the modulator of the invention, data is subjected digitally to balanced modulation so that a D/A conversion of the modulated data will be a ternary value which can have a positive value, mid-point value and negative value, and thus the output comes near to a sine wave. Therefore, a video signal processor capable of generating a high resolution composite video signal with less harmonic component as compared with a simple square wave, which has never been obtainable hitherto, may be provided.

Further, in the color burst signal generator of the invention, a high level (maximum value) and a low level (minimum value) of the color burst signal are generated alternatively by an MOS digital circuit, and an intermediate level is output when the color burst signal is not generated. Therefore, a video signal processor for generating a composite video signal superior both in amplitude characteristic and phase characteristic may be realized.

Still further, according to the digital-analog converter of the invention, the output level becomes constant in value when there is blanking or no color-difference component present. Therefore, a carrier leak will never arise. Then, the phase does not shift regardless of the magnitude of the amplitude, and a phenomenon (known as a glitch) wherein incorrect data are output transiently will never result, thus ensuring a high quality composite video signal which has never been obtainable hitherto.

Additionally, in the composite circuits of the invention, furthermore, a luminance signal, two color-difference signals and a color burst signal are each subjected to independent digital-analog conversion through four independent digital-analog converters, and are combined by an adjustable means (resistor or the like, for example) into a composite video signal, thereby obtaining a high quality composite video signal. Then, the tint can be adjusted or corrected, which is effective for producing accurate color information.

What is claimed is:

1. A video signal generator comprising:
conversion means for converting digital RGB color data into a luminance signal and two color-difference signals represented by analog values, wherein said conversion means comprise: digital conversion means for converting digital RGB color data into a luminance signal and two color-difference signals represented by digital values; and modulator and digital-analog converter means connected to said digital conversion means for modulating said two color-difference signals represented by digital values with two respective subcarriers represented by digital values and for converting the two modulated color-difference signals represented by digital values into two color-difference signals represented by analog values varying within an analog value range, and wherein said modulator and converter means are operative for giving each color-difference signal represented by analog values a signal value at the midpoint of the analog value range when the associated subcarrier experiences a change in level.

2. The video signal generator as defined in claim 1 wherein said modulator and converter means comprise balanced modulator means connected for modulating said two color-difference signals represented by digital values with two color-difference signal subcarriers represented by digital values and having a mutual phase difference of 90°.

3. The video signal generator as defined in claim 2 wherein said balanced modulator means comprise two modulators each connected to receive a respective one of the color-difference signals represented by digital values and a respective one of the color-difference signal subcarriers represented by digital values, each said modulator comprising: first logic circuit means connected for logically multiplying the signals received by said modulator; second logic circuit means connected for logically multiplying logically inverted versions of the signals received by said modulator; and third logic circuit means connected to receive the product signals produced by said first and second logic means for logically adding the product signals to output a respective modulated color-difference signal.

4. The video signal generator as defined in claim 2 wherein said balanced modulator means comprise two modulators each connected to receive a respective one of the color-difference signals represented by digital values and a respective color-difference subcarrier represented by digital values, each said modulator comprising: a plurality of first logic circuits connected for logically multiplying each bit of the one color-difference signal by the color-difference subcarrier; a plurality of second logic circuits each connected for logically multiplying a logically inverted version of each bit of the one color-difference signal by a logically inverted version of the color-difference subcarrier; a plurality of third logic circuits connected to respective ones of said first and second logic circuits for logically adding the products produced by said first and second logic circuits with respect to a given color-difference signal bit; and a plurality of fourth logic circuits each connected to receive the result produced by a respective third logic circuit and a signal related to the color-difference subcarrier and to produce an output signal value causing the analog value representing the associated color-difference signal to be at the midpoint of the analog value range when the associated color-difference subcarrier or the associated color-difference signal represented by digital values experiences a change in level.

5. The video signal generator as defined in claim 1 for producing a display during selected time intervals, wherein said modulator and converter means are operative for producing, for each signal to be converted, an analog output having a value between selected maximum and minimum values when the signal to be converted has a value different from a predetermined value during a selected time interval, and an anlog output having a value equal to the mean value between the selected maximum and minimum values during times outside of the selected time intervals or when the signal to be converted has a predetermined value.

6. The video signal generator as defined in claim 1 further comprising color burst signal generating means for producing an output which: alternates between maximum and minimum values of a color burst signal during time intervals when a color burst signal is to be produced; and which is fixed at a value midway between the maximum and minimum values during time intervals when a color burst signal is not to be produced.

7. A video signal generator comprising:
conversion means for converting digital RGB color data into a luminance signal and two color-difference signals represented by analog values, wherein said conversion means comprise: digital conversion means for converting said digital RGB color data into a luminance signal and two color-difference signals represented by digital values; and digital-analog converter means connected to said digital conversion means for converting said luminance signal and two color-difference signals represented by digital values into said luminance signal and two color-difference signals represented by analog values wherein said digital-analog converter means comprise a first converter supplying said luminance signal represented by analog values, and second and third converters supplying respective ones of said color-difference signals represented by analog values, each of said second and third converters being included in a MOS integrated circuit providing a converter output for supplying the respective color-difference signal represented by analog values, and said generator further comprises: means for producing an analog color burst signal; and signal combining means including a bipolar transistor having an input and an output, and resistance means connected for supplying to said bipolar transistor input the luminance signal represented by analog values, the color-difference signals represented by analog values and the analog color burst signal, said transistor being operative for supplying at said output a composite video signal constituting a combination of the signals supplied to said input, and said resistance means having resistance values selected for adjusting the relative phase or the relative amplitude of each signal supplied to said bipolar transistor input in order to control the color of the resulting display.

8. A video signal generator comprising:
conversion means for converting digital RGB color data into two color-difference signals represented by analog values, wherein said conversion means comprise: digital conversion means for converting digital RGB color data into two color-difference signals represented by digital values; and digital-analog converter means connected to said digital conversion means for converting said two color-difference signals represented by digital values into said two color-difference signals represented by analog values wherein said digital analog converter means are operative for producing, for each signal to be converted, an analog output having a value between selected maximum and minimum values, when the signal to be converted has a value differnt from a predetermined value during a selected time interval, and an analog output having a value equal to the mean value between the selected maximum and minimum values during times outside of the selected time intervals or when the signal to be converted has a predetermined value.

9. The video signal generator as defined in claim 8 wherein said digital analog converter means comprise, for each signal to be converted: two supply terminals each providing a voltage corresponding to a respective one of the selected maximum and minimum values of the analog output; a plurality of resistors connected together in series between said terminals and defining a plurality of tap points between successive resistors; an analog signal output terminal; and a plurality of transmission gates each composed of at least one MOS transistor and defining a controllable current path between a respective one of said supply terminals and tap points and said analog signal output terminal, said transmission gates being controllable such that each transmission gate is conductive for a respective value of the signal to be converted and such that a selected transmission gate is conductive for connecting the tap point which is at a voltage constituting said mean value to said analog signal output terminal during times outside of the selected time intervals and during times when the signal to be converted has a predetermined value.

10. A video signal generator comprising:
conversion means for converting digital RGB color data into a luminance signal and two color-difference signals represented by analog values, wherein said conversion means comprise: digital conversion means for converting said digital RGB color data into a luminance signal and two color-difference signals represented by digital values; and digital-analog converter means connected to said digital conversion means for converting said luminance signal and two color-difference signals represented by digital values into said luminance signal and two color-difference signals represented by analog values; and color burst signal generating means for producing an output which: alternates between maximum and minimum values of a color burst signal during time intervals when a color burst signal is to be produced; and which is fixed at a value midway between the maximum and minimum values during time intervals when a color burst signal is not to be produced.

11. The video signal generator as defined in claim 10 wherein said color burst signal generating means comprise: two supply terminals each providing a voltage corresponding to a respective one of the maximum and minimum color burst signal values; two resisters connected in series between said terminals and having a connection point providing a voltage midway between the voltages at said two supply terminals; a color burst signal output terminal; and three transmission gates each composed of at least one MOS transistor and each connected between said color burst signal output terminal and a respective one of said two supply terminals and connection point.

12. A video signal generator comprising:
means defining a color pallet RAM and a CPU or controller for addressing said color pallet RAM in order to convert a color code specifying the color of each pixel of a display picture into digital RGB color data; and conversion means for converting said RGB color data into a luminance signal and two color-difference signals represented by analog values, wherein said conversion means comprise: digital conversion means for converting said digital RGB color data into a luminance signal and two color-difference signals represented by digital values; and modulator and digital-analog converter means connected to said digital conversion means for modulating said two color-difference signals represented by digital values with two respective subcarriers represented by digital values and for converting the luminance signal represented by digital values and the two modulated color-difference signals represented by digital values into the luminance signal and two color-difference signals represented by analog values varying within an analog value range, and wherein said modulator and converter means are operative for giving each color-difference signal represented by analog values a signal value at the midpoint of the analog value range when the associated subcarrier experiences a change in level.

13. A video signal generator comprising:
means defining a color pallet RAM and a CPU or controller for addressing said color pallet RAM in order to convert a color code specifying the color of each pixel of a display picture into digital RGB color data; and conversion means for converting said RGB color data into a luminance signal and two color-difference signals represented by analog values, wherein said conversion means comprise: digital first conversion means for converting said digital RGB color data into a luminance signal and two color-difference signals represented by digital values; and digital-analog converter means connected to said digital first conversion means for converting said luminance signal and two color-difference signals represented by digital values into said luminance signal and two color-difference signals represented by analog values, wherein said digital analog converter means are operative for producing, for each color-difference signal to be converted, an analog output having a value between selected maximum and minimum values when the signal to be converted has a value different fromm a predetermined value during a selected time interval, and an analog output having a value equal to the mean value between the selected maximum and minimm values during times outside of the selected time intervals or when the signal to be converted has a predetermined value.

14. A video signal generator comprising:
means defining a color pallet RAM and a CPU or controller for addressing said color pallet RAM in order to convert a color code specifying the color of each pixel of a display picture into digital RGB color data; and conversion means for converting said RGB color data into a luminance signal and two color-difference signals represented by analog values, wherein said conversion means comprise: digital conversion means for converting said digital RGB color data into a luminance signal and two color-difference signals represented by digital values; digital-analog converter means connected to said digital conversion means for converting said luminance signal and two color-difference signals represented by digital values into said luminance signal and two color-difference signals represented by analog values; and color burst signal generating means for producing an output which: alternates between maximum and minimum values of a color burst signal during time intervals when a color burst signal is to be produced; and which is fixed at a value midway between the maximum and minimum values during time intervals when a color burst signal is not to be produced.

15. A video signal generator comprising:
conversion means for converting digital RGB color data into a luminance signal and two color-difference signals represented by analog values, wherein said conversion means comprise: digital conversion means for converting said digital RGB color data into a luminance signal and two color-difference signals represented by digital values; digital-analog converter means connected to said digital conversion means for converting said luminance signal and two color-difference signals represented by digital values into said luminance signal and two color-difference signals represented by analog values; and balanced modulator means connected for modulating said two color-difference signals represented by digital values with color-difference signal subcarriers represented by digital values and operative for supplying to said digital-analog converter means, when a level of one of said color-difference signal subcarriers experiences a change in level, a signal value causing the analog value representing that color-difference signal to be at the mid-point of the analog value range.

16. The video signal generator as defined in claim 15 wherein said balanced modulator means comprise two modulators each connected to receive a respective one of the color-difference signals represented by digital values and a respective color-difference subcarrier represented by digital values, each said modulator comprising: a plurality of first logic circuits connected for logically multiplying each bit of the one color-difference signal by the color-difference subcarrier; a plurality of second logic circuits each connected for logically multiplying a logically inverted version of each bit of the one color-difference signal by a logically inverted version of the color-difference subcarrier; a plurality of third logic circuits each connected to respective ones of said first and second logic circuits for logically adding the products produced by said first and second logic circuits with respect to a given color-difference signal bit; and a plurality of fourth logic circuits each connected to receive the result produced by a respective third logic circuit and a signal related to the color-difference subcarrier and to produce an output signal value causing the analog value representing the associated color-difference signal to be at the midpoint of the analog value range during each change in phase of the color-difference subcarrier.

17. A video signal generator comprising:
conversion means for converting digital RGB color data into a luminance signal and two color-difference signals represented by analog values, wherein said conversion means comprise: digital conversion means for converting digital RGB color data into a luminance signal and two color-difference signals represented by digital values; and modulator and digital-analog converter means connected to said digital conversion means for modulating said two color-difference signals represented by digital values with two respective subcarriers represented by digital values and for converting the two modulated color-difference signals represented by digital values into two color-difference signals represented by analog values varying within an analog value range and means connected to said modulator and converter means for supplying respective digital modulation control signals, each associated with a respective subcarrier, each modulation control signal having a first signal state during an interval when its respective subcarrier undergoes a change in phase, and wherein said modulator and converter means are operative for giving each colordifference signal represented by analog values a signal value at the midpoint of the analog value range during each interval when the associated modulation control signal has the first signal state.

* * * * *